(12) United States Patent
Kumagai et al.

(10) Patent No.: US 9,540,262 B2
(45) Date of Patent: Jan. 10, 2017

(54) PLASMA GENERATING APPARATUS AND PLASMA GENERATING METHOD

(71) Applicant: PANASONIC CORPORATION, Osaka (JP)

(72) Inventors: Hironori Kumagai, Osaka (JP); Shin-ichi Imai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 530 days.

(21) Appl. No.: 14/032,477

(22) Filed: Sep. 20, 2013

(65) Prior Publication Data

US 2014/0014516 A1 Jan. 16, 2014

Related U.S. Application Data

(63) Continuation of application No. PCT/JP2012/003143, filed on May 14, 2012.

(30) Foreign Application Priority Data

May 17, 2011 (JP) .................................. 2011-110169
Dec. 26, 2011 (JP) .................................. 2011-284107

(51) Int. Cl.
*C02F 1/48* (2006.01)
*C02F 1/46* (2006.01)
*C02F 1/461* (2006.01)

(52) U.S. Cl.
CPC ............... *C02F 1/48* (2013.01); *C02F 1/4608* (2013.01); *C02F 2001/46123* (2013.01);
(Continued)

(58) Field of Classification Search
CPC . C02F 1/48; C02F 1/4608; C02F 2201/46175; C02F 2201/4619; C02F 2201/46123; C02F 2201/46138; C02F 2201/46152; C02F 2201/46125; C02F 2307/12; C02F 2209/38; C02F 2303/04; C02F 2305/023
See application file for complete search history.

(56) References Cited

U.S. PATENT DOCUMENTS 5,464,513 A 11/1995 Goriachev et al.
5,626,726 A * 5/1997 Kong .................... C10G 15/12
204/172

(Continued)

FOREIGN PATENT DOCUMENTS

CN 1654343 A 8/2005
EP 2072471 A1 6/2009
(Continued)

OTHER PUBLICATIONS

European Office Action issued in European Application No. 12785153.3-1352, dated Nov. 24, 2014.
(Continued)

*Primary Examiner* — Kishor Mayekar
(74) *Attorney, Agent, or Firm* — McDermott Will & Emery LLP

(57) ABSTRACT

The plasma-generating apparatus includes a treatment vessel 509 containing to-be-treated water 510, a first electrode 504 and a second electrode 502 within the treatment vessel, a bubble-generating part which generate a bubble 506 such that a surface where conductor of the first electrode 504 is exposed to the to-be-treated water is positioned within the bubble 506, a gas-supplying apparatus 505 which supplies gas to the bubble-generating part, a pulsed power supply 501 connected to the first and the second electrodes 502 and 504, a control apparatus 520 which controls one or both of the gas-supplying apparatus and the power supply such that the voltage is applied between the first and the second electrodes (Continued)

502 and 504 when at least surface where the conductor of the first electrode 504 is exposed is positioned within the bubble.

25 Claims, 39 Drawing Sheets

(52) U.S. Cl.
CPC ............... *C02F 2001/46138* (2013.01); *C02F 2001/46152* (2013.01); *C02F 2201/4619* (2013.01); *C02F 2201/46125* (2013.01); *C02F 2201/46175* (2013.01); *C02F 2209/38* (2013.01); *C02F 2303/04* (2013.01); *C02F 2305/023* (2013.01); *C02F 2307/12* (2013.01)

(56) References Cited

U.S. PATENT DOCUMENTS

| | | | |
|---|---|---|---|
| 5,630,915 | A | 5/1997 | Greene et al. |
| 6,328,898 | B1 | 12/2001 | Akiyama et al. |
| 7,710,562 | B2 | 5/2010 | Hori et al. |
| 8,653,404 | B2 | 2/2014 | Murase et al. |
| 2004/0007539 | A1 | 1/2004 | Denes et al. |
| 2005/0189278 | A1 | 9/2005 | Iijima et al. |
| 2008/0239312 | A1 | 10/2008 | Hori et al. |
| 2010/0126940 | A1 | 5/2010 | Ryu et al. |
| 2010/0209293 | A1 | 8/2010 | Ikawa et al. |
| 2010/0219136 | A1 | 9/2010 | Campbell et al. |
| 2010/0239473 | A1 | 9/2010 | Iijima et al. |
| 2013/0098753 | A1 | 4/2013 | Sanematsu |
| 2013/0291794 | A1 | 11/2013 | Sanematsu et al. |
| 2013/0299090 | A1 | 11/2013 | Saitoh et al. |
| 2013/0333841 | A1 | 12/2013 | Narita et al. |
| 2013/0334955 | A1 | 12/2013 | Saitoh et al. |
| 2014/0014516 | A1 | 1/2014 | Kumagai et al. |

FOREIGN PATENT DOCUMENTS

| | | | |
|---|---|---|---|
| JP | 2000-093967 A | 4/2000 | |
| JP | 2001-010808 A | 1/2001 | |
| JP | 2002-159973 A | 6/2002 | |
| JP | 2003-062579 A | 3/2003 | |
| JP | 2005-058886 A | 3/2005 | |
| JP | 2005-058887 A | 3/2005 | |
| JP | 2005-218890 A | 8/2005 | |
| JP | 2005-296909 A | 10/2005 | |
| JP | 2007-038110 A | 2/2007 | |
| JP | 2007-059318 A | 3/2007 | |
| JP | 2007-188690 A | 7/2007 | |
| JP | 2007-207540 A | 8/2007 | |
| JP | 3983282 B2 | 9/2007 | |
| JP | 2008-173521 A | 7/2008 | |
| JP | 2008-178870 A | 8/2008 | |
| JP | 2008-241293 A | 10/2008 | |
| JP | 2009-255027 A | 11/2009 | |
| JP | 2010-022991 A | 2/2010 | |
| JP | 2010-523326 A | 7/2010 | |
| JP | 2011-041914 A | 3/2011 | |
| JP | 2012-043769 A | 3/2012 | |
| JP | 2012-164556 A | 8/2012 | |
| JP | 2012-164557 A | 8/2012 | |
| JP | 2012-164558 A | 8/2012 | |
| JP | 2012-164559 A | 8/2012 | |
| JP | 2012-164560 A | 8/2012 | |
| JP | 2012-204248 A | 10/2012 | |
| JP | 2012-204249 A | 10/2012 | |
| JP | 2013-022475 A | 2/2013 | |
| JP | 2013-022476 A | 2/2013 | |
| JP | 2013-111312 A | 6/2013 | |
| JP | 5362934 B2 | 12/2013 | |
| WO | 95-18768 A1 | 7/1995 | |
| WO | 2006/059808 A1 | 6/2006 | |
| WO | 2008-123749 A1 | 10/2008 | |
| WO | 2012/011332 A1 | 1/2012 | |
| WO | 2012/108235 A1 | 8/2012 | |
| WO | 2012/108260 A1 | 8/2012 | |
| WO | 2012/132596 A1 | 10/2012 | |
| WO | 2012/132611 A1 | 10/2012 | |
| WO | 2013/011761 A1 | 1/2013 | |
| WO | 2013/011762 A1 | 1/2013 | |
| WO | 2013/080435 A1 | 6/2013 | |

OTHER PUBLICATIONS

European Office Action issued in European Application No. 12785153.3 dated Apr. 24, 2015.
Extended European Search Report issued in Application No. 12785153.3 mailed Mar. 11, 2014.
English Translation of the International Preliminary Report on Patentability issued in International Application No. PCT/JP2011/007272 mailed Nov. 21, 2013.
English Translation of the International Preliminary Report on Patentability issued in International Application No. PCT/JP2012/003143 mailed Nov. 21, 2013.
International Search Report issued in International Application No. PCT/JP2011/007272 with Date of Mailing Feb. 7, 2012.
International Search Report issued in PCT/JP2012/003143, dated Jul. 31, 2012.
Chinese Office Action and Search Report issued in Application No. 201280014102.8 dated Jul. 9, 2015, with English Translation.
U.S. Office Action issued in U.S. Appl. No. 14/113,370 dated Aug. 5, 2016.

\* cited by examiner

Absence of bubble

Presence of bubble

Equivalent circuit of plasma generation portion

PLASMA GENERATING APPARATUS AND PLASMA GENERATING METHOD

CROSS REFERENCE TO RELATED APPLICATIONS

This is a continuation application of PCT Application No. PCT/JP2012/003143, filed on May 14, 2012, designating the United States of America, which claims the priorities of Japanese Patent Application No. 2011-110169 filed on May 17, 2011 and Japanese Patent Application No. 2011-284107 filed on Dec. 26, 2011, the disclosure of which, including the specifications, drawings, and claims, are incorporated herein by reference in their entireties.

TECHNICAL FIELD

The present invention is related to a plasma-generating apparatus which generates plasma in liquid, in particular a liquid-treating apparatus which treats the liquid by generating plasma.

BACKGROUND ART

A conventional liquid-treating apparatus using a high-voltage pulse discharge is described in, for example, JP 2009-255027 A. FIG. 10 shows a configuration view of a conventional sterilizing apparatus described in JP 2009-255027 A.

The sterilizing apparatus 1 shown in FIG. 10 comprises a discharge electrode 6 including a pair of a columnar high-voltage electrode 2 and a plate-shaped ground electrode 3. The high-voltage electrode 2 is covered with insulator 4 except for an end face of a tip portion 2a, to form a high-voltage electrode portion 5. The tip portion 2a of the high-voltage electrode 2 and the ground electrode 3 are opposed to each other with a predetermined gap, being immersed in to-be-treated water 8 within a treatment vessel 7. The high-voltage electrode 2 and the ground electrode 3 are connected to a power supply 9 which generates high-voltage pulses. The discharge is made by applying negative high-voltage pulses of 2 kV/cm to 50 kV/cm and 100 Hz to 20 kHz between both electrodes. Bubbles 10 of steam and a jet flow 11 caused by bubbles 10 are generated by evaporation of water with energy of discharge and vaporization involved by a shock wave and a jet flow 11 is generated by the bubbles 10. Plasma generated around the high-voltage electrode 2 generates OH, H, O, $O_2^-$, $O^-$, and $H_2O_2$ to destroy microorganism and bacteria.

Similarly, JP 2007-207540 A proposes a method for purifying liquid wherein the liquid is boiled and vaporized to form bubbles and ionize the vaporized substance (generate plasma) within the bubbles to form ions and the ion species in the plasma are penetrated and diffused in the liquid. JP 2007-207540 A describes that, in order to generate plasma, high-voltage pulses having a maximum voltage of about 1 kV to 50 kV, repeated frequencies of 1 kHz to 100 kHz and a duration of 1 μs to 20 μs, are applied to an electrode pair of high-voltage electrodes.

Another conventional liquid-treating apparatus is described in JP 2000-93967 A. JP 2000-93967 A discloses that a liquid-treating apparatus described in this document can reduce an applied voltage by interposing bubbles, which are supplied from outside, between electrodes in liquid, whereby power consumption can be reduced. Similar techniques are disclosed in JP 2003-62579 A and JP 2010-523326 A and JP 3983282 B.

SUMMARY OF INVENTION

One embodiment of the present invention provides a plasma-generating apparatus and a plasma-generating method which generate plasma efficiently so as to, for example, enable liquid to be treated in a short period of time and/or with a low power.

A plasma-generating apparatus which is one embodiment of the present invention includes: a first electrode of which at least a part is placed in a treatment vessel that is to contain liquid, a second electrode of which at least a part is placed in the treatment vessel, a bubble-generating part which generates a bubble in the liquid when the liquid is contained in the treatment vessel such that at least surface where conductor is exposed, of a surface of the first electrode which surface is positioned in the treatment vessel, is positioned within the bubble, a gas-supplying apparatus which supplies gas in an amount necessary for the bubble-generating part to generate the bubble from the outside of the treatment vessel to the bubble-generating part, a power supply which applies voltage between the first electrode and the second electrode, and a control apparatus which controls one or both of the gas-supplying apparatus and the power supply such that the voltage is applied between the first electrode and the second electrode when the at least surface where the conductor is exposed, of the first electrode is positioned within the bubble.

The plasma-generating apparatus according to one embodiment of the present invention can generate plasma efficiently and thereby enables the liquid to be treated with low power and/or in a short period of time, reducing loss of power consumption.

BRIEF DESCRIPTION OF DRAWINGS

FIG. 1-2 is a sectional side view wherein vicinity of an opening portion of an electrode in the first embodiment is enlarged.

FIG. 1-3 is a photograph showing bubbles generated in the first embodiment.

FIG. 2 is a graph showing spectral characteristics of plasma generated in the first embodiment.

FIG. 3 is a graph showing change over time in transmittance of an aqueous indigocarmine solution in the first embodiment.

FIG. 4-2 is a sectional side view wherein vicinity of an opening portion of an electrode in the second embodiment is enlarged.

FIG. 4-3 is a photograph showing bubbles generated in the second embodiment.

FIG. 7-2 is a graph showing relationship between complete decolorization time of the aqueous indigocarmine solution and the distance between the end face of the insulator and the end face of the second electrode in the third embodiment.

FIG. 7-3 is a photograph showing bubbles generated in the third embodiment.

CIRCUMSTANCES WHERE AN EMBODIMENT OF THE PRESENT INVENTION WAS OBTAINED

There was a problem that generation efficiency of plasma was low in the above-described conventional apparatuses, requiring a long time of period for treating liquid. Further, when the plasma is generated in bubbles formed by vaporization of the liquid, it is necessary to input high electrical power to vaporize the liquid since the electrical power was lost in the liquid, which requires a large-scale power supplying apparatus. Specifically, the power supplying apparatus is required to have ability of supplying electricity power of 4000 W or more in order to vaporize water, considering the loss. One embodiment of the present invention provides a plasma generating apparatus and a plasma generating method which generate plasma efficiently so as to, for example, enable liquid to be treated in a short period of time and/or with a low power.

Embodiments of the present invention will be described with reference to the drawings.

First Embodiment

[Overall Configuration]

Figure 1:
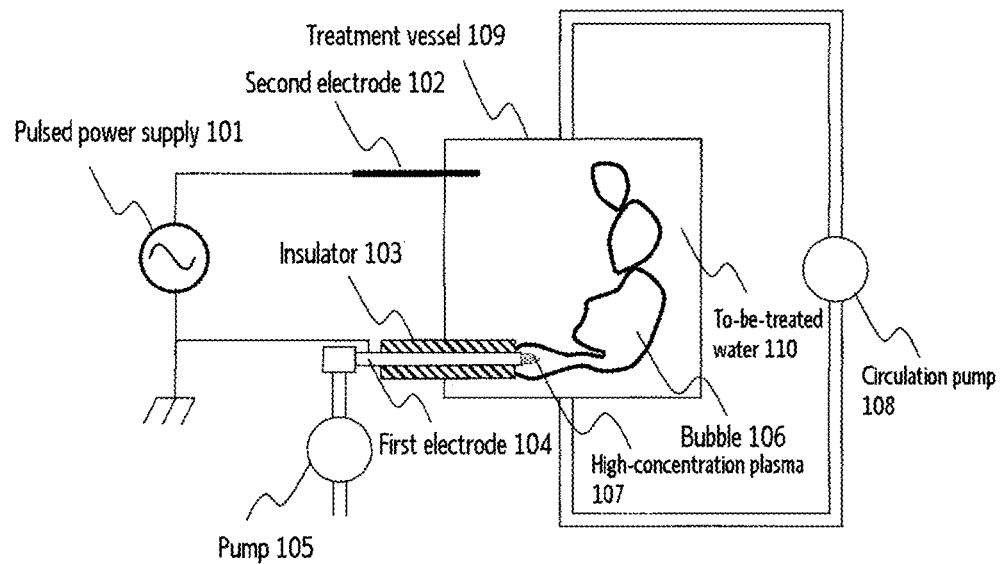
FIG. 1 is a configuration view of a liquid-treating apparatus in a first embodiment.

FIG. 1 is a diagram showing the overall configuration of a liquid-treating apparatus according to the present embodiment. The liquid-treating of the present embodiment is one embodiment of a plasma-generating apparatus which performs decomposition of chemical material, destruction of microorganisms, sterilization and the like by generating a variety of radicals by the plasma.

In FIG. 1, the treatment vessel 109 is filled with water as the liquid to be treated (to-be-treated water) 110. The treatment vessel 109 has capacity of about 0.25 liters (about 250 cm$^3$). In one of the walls of the treatment vessel 109, a second electrode 102 and a first electrode 104 which pass through the wall, are disposed and one end of each electrode is disposed within the treatment vessel 109. The first electrode 104 has a shape of which both ends are opened (more specifically a cylindrical shape), and an opening portion at one end is connected to a pump 105 as a gas-supplying apparatus. A gas is supplied through the opening portion at the other end of the first electrode 104 into the treatment vessel 109 by the pump 105. The gas supplied from the outside of the treatment vessel 109 is air, He, Ar, O$_2$ or the like. The gas is supplied from a gas-supplying source (not shown) which is provided separately or atmosphere gas in which the treatment vessel 109 is placed is supplied as it is. The second electrode 102 is columnar, and is placed such that one end contacts the to-be-treated water 110 in the treatment vessel 9. A pulsed voltage or an alternating voltage is applied between the second electrode 102 and the first electrode 104 by the power supply 101. Further, the to-be-treated water 110 is circulated by a circulation pump 108. A circulation speed of the to-be-treated water 110 is set at an appropriate value based on a decomposition speed of a material to be decomposed by plasma and a capacity of the treatment vessel 109.

A dimension of the treatment vessel 109 is not limited particularly. For example, the dimension of the treatment vessel 109 may be one having a capacity of 0.1 liters to 1000 liters.

In case where the liquid-treating apparatus is incorporated in a household appliance, the volume of a unit consisting of the power supply and the pump is, for example, 1000 cm$^3$ to 5000 cm$^3$. Such a volume is obtained by designing a cubic of which length×width×height is 100 mm×100 mm×100 mm to 171 mm×171 mm×171 mm. Alternatively, the unit consisting of the power supply and the pump may be of rectangular parallelepiped or another shape. When the dimension (that is, the volume) of the unit consisting of the power supply and the pump which is included in the liquid-treating apparatus is too large in the household appliance, the household appliance itself becomes large. Since the liquid-treating apparatus of the present embodiment can generate plasma efficiently, the liquid can be treated with the power supply which is small enough to be received by the unit of the above volume.

[Electrode Configuration]

Figures 1, 2:
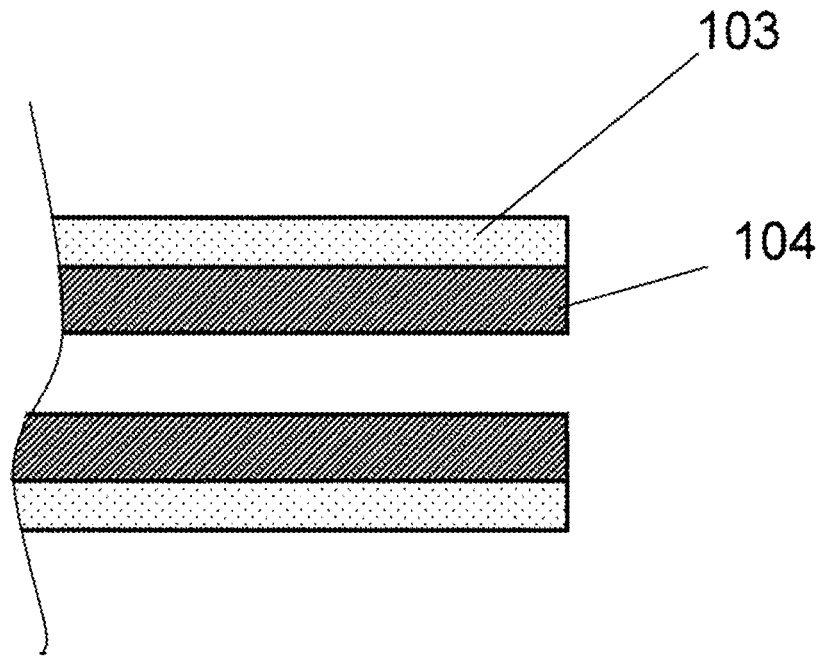

FIG. 1-2 is a sectional side view showing an enlarged vicinity of the opening portion of the first electrode 104. The first electrode 104 is a cylindrical electrode of a metal and has an inner diameter of 0.4 mm and an outer diameter of 0.6 mm. Insulator is positioned on and contacts with an outer peripheral surface of the first electrode 104 without forming a gap between the insulator and the first electrode 104, and thereby the metal is exposed only at the end face of the first electrode. The outer peripheral surface of the first electrode 104 does not contact with the to-be-treated water 110 directly by the disposition of the insulator on the outer peripheral surface of the electrode without gap. In the present embodiment, titanium oxide as the insulator was plasma-sprayed directly on the first electrode 104 and the thickness of the insulator was 0.1 mm. The titanium oxide is suitably used as the insulator when the treated liquid is used in life of person since the titanium oxide has less effect on the human body.

When the gas is continued to be supplied from the opening portion of the first electrode 104 in the to-be-treated water 110 using the above configuration, a bubble 106 is formed in the to-be-treated water 110. The bubble 106 is a columnar bubble having a dimension such that the gas within the bubble covers the opening portion of the first electrode 104, that is, the opening portion of the first electrode 104 is positioned within the bubble 106. Therefore, the first electrode 104 also functions as a bubble-generating part in the first embodiment. The end face of the opening portion of the first electrode 104 is not covered by the insulator 103 as shown in FIG. 1-2, and exposes metal. The state wherein the vicinity of the opening portion of the first electrode 104 is covered with the gas within the bubble 106 can be maintained by setting an amount of supplied gas with use of the pump 105. In other words, the first electrode 104 which serves as the gas-generating part is required to generate the bubble such that at least surface where the conductor is exposed, of the surface of the first electrode 104 which surface is positioned in the treatment vessel, is positioned within the bubble; and the pump 105 serving as the gas-supplying apparatus supplies a sufficient amount of gas to be generated such a bubble from the outside of the treatment vessel to the first electrode serving as the bubble-generating part. The insulator of titanium oxide is disposed on the outer peripheral surface of the first electrode 104. Therefore, it can be said that the surface of the first electrode 104 is constructed such that the state where the surface of the first electrode 104 does not contact directly with the to-be-treated water 110 can be achieved. When an appropriate amount of gas is continued to be supplied, the state is achieved where the surface of the first electrode 104 does not contact directly with the to-be-treated water 110, that is, the state is achieved where the conductor of the first electrode 104 is not exposed to the to-be-treated water 110.

In the present specification, "the first electrode (or the surface of the first electrode) does not contact directly with liquid (to-be-treated water)" means that the surface of the first electrode does not contact with liquid as a large mass in the treatment vessel. Therefore, when the bubble is generated from the bubble-generating part with the surface of the first electrode wet (strictly, with the surface of the first electrode in contact with the liquid), a state where the surface is covered with the gas within the bubble may be achieved. Such state is included in the state where "the first electrode does not contact directly with liquid."

[Operation]

Next, the operation of the liquid-treating apparatus of the present embodiment is described.

Firstly, the gas is supplied by the pump 105 into the to-be-treated water 110 from one opening portion of the first electrode 104 which portion is positioned in the treatment vessel. The flow rate of the gas is, for example, 500 ml/min to 2000 ml/min. In the to-be-treated water 110, the columnar bubble 106 is formed such that the gas inside the bubble 106 covers the opening portion of the first electrode 104 as described above. The bubble 106 is a single and large bubble which is continuous over a certain distance (20 mm or more in the illustrated embodiment) from the opening portion of the first electrode 104. In other words, the supply of gas gives the state where the vicinity of the opening portion of the first electrode 104 is positioned within the bubble 106 and covered with the gas within the bubble 106. The bubble 106 of which internal gas covers the end face of the opening portion of the first electrode 104 is defined in the liquid by a gas-liquid interface which is not "close", and contacts with the insulator 103 around the opening portion of the first electrode 104. As described above, the conductor is exposed only at the end face of the opening portion in the external surface of the first electrode 104, and therefore the external surface of the first electrode 104 is isolated from the to-be-treated water 110 by the bubble 106 and the insulator 103 as a result of generation of the bubble 106. The inside surface (inner peripheral surface) of the first electrode 104 is covered by the gas supplied during the formation of the gas 106 and does not contact directly with the to-be-treated water 110. However, as described below, the to-be-treated water 110 and the first electrode 104 contact slightly to form leak resistance.

It is preferable that the vicinity of the opening portion of the first electrode 104 is positioned within the bubble 106, that is, continuously covered with the gas within the bubble 106 during the application of voltage between the first electrode 104 and the second electrode 102. However, when the supplied amount (flow rate) of the gas is small, and even if the gas is continuously supplied, the vicinity of the opening portion of the first electrode 104 may not be positioned within the bubble 106 resulting in direct contact with the to-be-treated water 110. The presence or absence of such contact can be observed by taking a photograph of the vicinity of the first electrode 104 every 0.1 ms to 0.5 ms during the supply of gas, using a high-speed camera. Further, it is possible to know a frequency of contact between the first electrode 104 and the liquid by taking photographs with use of a highly sensitive camera while the gas is supplied continuously for 1 seconds to 30 seconds, and determining an electrode coverage by the following formula. Whether the surface where the conductor is exposed, of the first electrode is positioned within the bubble or not is judged by visual observation of the photographs. The gas is supplied in the plasma-generating apparatus of this embodiment and other embodiments such that the electrode coverage is, for example, 90% or more, particularly 94% or more.

Electrode coverage (%)=[(number of images (photographs) wherein the conductor-exposed surface of the first electrode is positioned within the bubble)/(total number of images (photographs) taken)]×100

Figures 1, 2, 3:
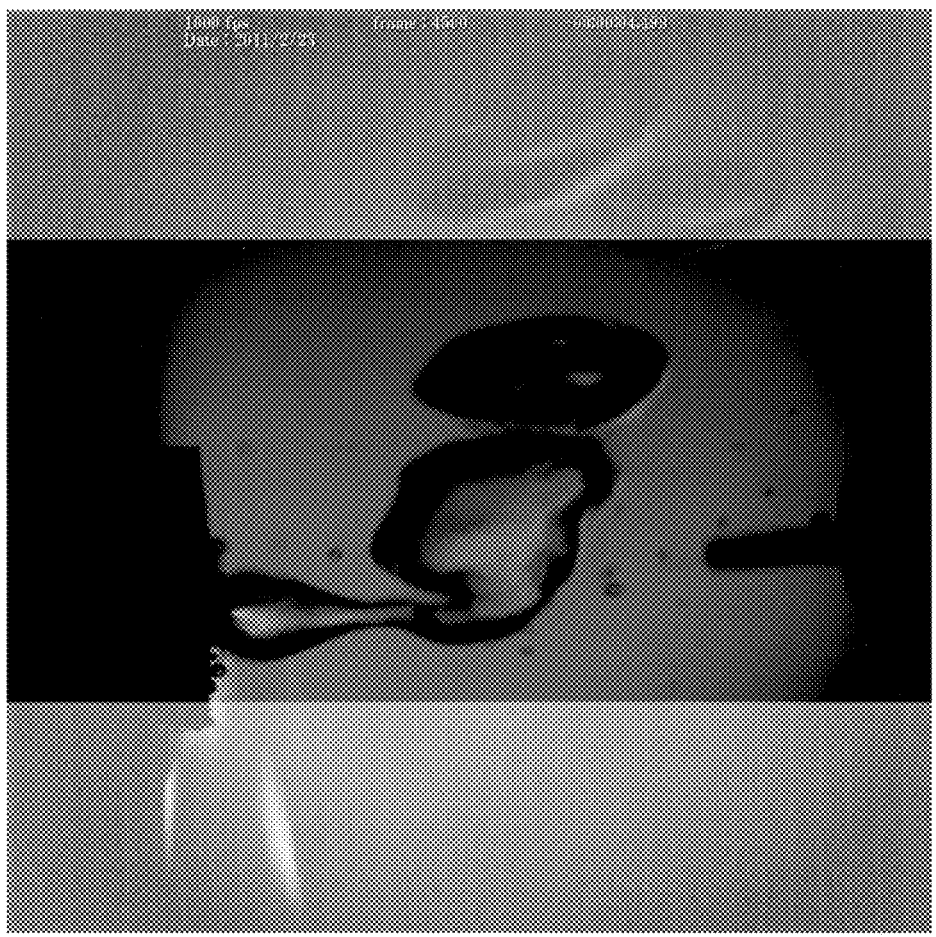
Figure 2:
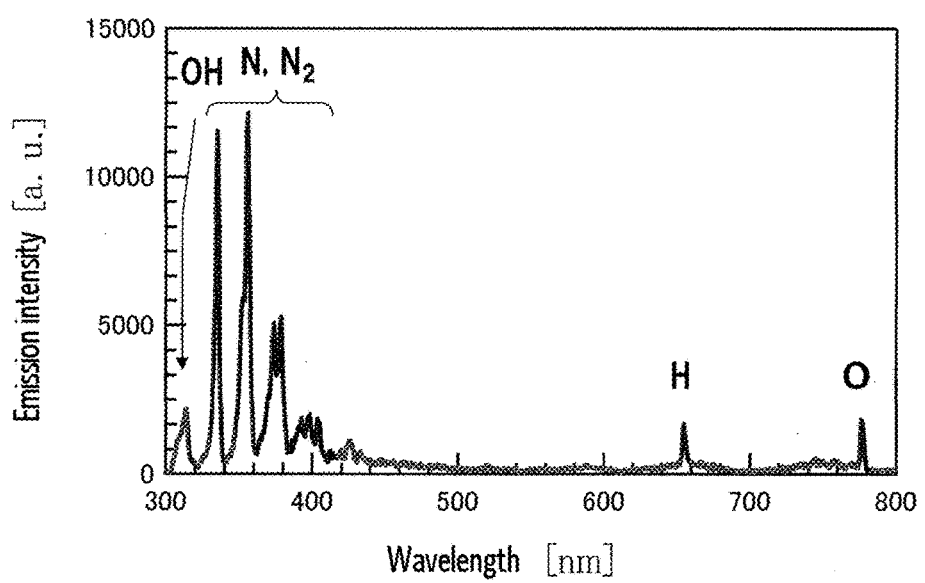
Figure 3:
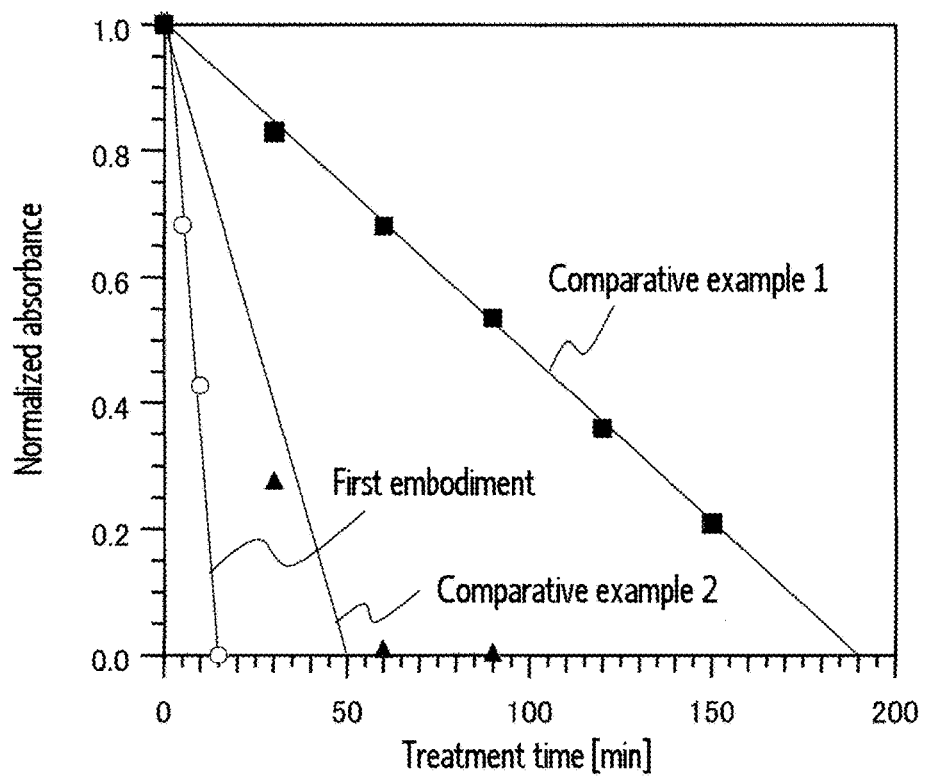

Next, the voltage is applied between the first electrode 104 and the second electrode 102. The pulsed voltage is applied to the first electrode 104 with the second electrode 104 grounded. For example, a pulsed voltage having a peak voltage of 4 kV, a pulse duration of 1 μs and a frequency of 30 kHz. The power is, for example, 200 W. Plasma is generated in the vicinity of the first electrode 104 by the application of the voltage between the first electrode 104 and the second electrode 102. Although the plasma is spread over the entire of the bubble 106, concentrated plasma 107 is formed particularly in the vicinity of the first electrode 104. It is found that the plasma is also formed in the inside of the first electrode (the inner peripheral portion of the cylindrical first electrode) and not only the tip portion but the entire electrode is effectively used. Further, the observation by the high-speed camera shows a relatively smooth surface of the bubble as shown in FIG. 1-3 and it is considered that the shock wave due to the plasma is not generated.

The distance between the first electrode 104 and the second electrode 102 is not limited particularly. For example, it is not necessary to limit the electrode distance to 1 mm to 50 mm as described in JP 2009-255027 A. The plasma can be generated even if the distance between the electrodes is more than 50 mm.

Further, the first electrode 104 and the second electrode 102 are not required to be opposed to each other. The position of the second electrode 102 is not limited as long as at least a part of the second electrode 102 contacts with the to-be-treated water 110 in the treatment vessel 109. This is because the entire to-be-treated water functions as an electrode as a result of contact of the second electrode 102 with the to-be-treated water 110. In other words, it is considered that the entire surface of the to-be-treated water 110 which contacts with the bubble 106 functions as the electrode when viewed from the first electrode 104.

Further, a frequency of the pulsed voltage is not limited particularly. For example, the plasma can be sufficiently generated by application of pulsed voltage of 1 Hz to 30 kHz. On the other hand, it is needless to say that the voltage is not determined only by the performance of the power supply, and it is determined by balance with the impedance of a load. There is an advantage that lifetime of the electrode is improved by applying a bipolar pulsed voltage, that is, by applying positive voltage and negative voltage alternately. In this embodiment, the power supply which is capable of outputting a voltage of 6 kV without a load is used, and a voltage of 4 kV can be applied actually, under the condition that the loads including the electrodes are connected thereto as described above. In this manner, the plasma can be formed with less loss of the voltage in the present embodiment.

The voltage required for forming the plasma in this embodiment will be described below.

As described in JP 2007-207540 A, energy for vaporizing the liquid is required to be provided in a method for forming plasma wherein the liquid is once vaporized using a flash boiling phenomenon. Specifically, the flash boiling phenomena is caused by applying large current of tens of amperes. In this case, the size of bubble generated by vaporization of liquid is small and of the millimeter order, which makes it impossible to carry out sterilization in a large amount of liquid or a high-speed sterilization of the minute order. Thus, the plasma generation which employs the flash boiling phenomenon is not a technique suitable for practical use. This is apparent from the Paschen's law.

In addition, the discharge involving application of a large electric current of several tens of amperes is likely to be arc discharge, depleting the electrode vigorously. Furthermore, there is a problem that the plasma cannot be generated when the resistance of the liquid is large (the conductivity is small) since such a large current cannot flow. That is, the plasma generation utilizing a flash boiling phenomenon in the liquid requires at least the conductivity comparable to that of tap water. The conductivity of tap water is about 20 mS/m. However, the plasma is often generated in the liquid of which conductivity is significantly smaller than 20 mS/m. Thus, when the plasma is generated in the liquid having such a low conductivity by a flash boiling phenomenon, it is necessary to increase the conductivity of the liquid by addition of an electrolyte, requiring additional costs and processes.

In the apparatus of the present embodiment, instead of generating plasma by vaporizing the liquid, the gas is supplied from the outside to form a large liquid wall of the centimeter order in the liquid and the plasma is generated in a large bubble which is defined by the liquid wall. This successfully generated large plasma with a small current of several amperes or less. This corresponds to change of plasma itself from a "resistor" to a "capacitance" when viewed from electrical standpoint. In other words, this means that a DC voltage including AC and pulsed voltage is suitable as the power supply itself. Further, in the present embodiment, it is possible to generate plasma at a relatively low voltage.

Here, the relationship between the device configuration of the plasma generation part (including plasma) and the power supply in the present embodiment are further discussed. In the device configuration of the plasma generation part in the present embodiment (hereinafter referred to as merely "device configuration"), a hollow conductor which is the first electrode is covered with the insulator and the bubble is generated through the hollow portion of the conductor which is the first electrode. Thereby, the plasma is generated while the surface of the conductor is isolated from the liquid even in the liquid. However, the liquid and the conductor are connected with a high resistance by slight moisture entering into the conductor. This high resistance at the interface portion is referred to as "leakage resistance." FIG. 32 shows this state as described above by an equivalent circuit diagram.

Figure 32:
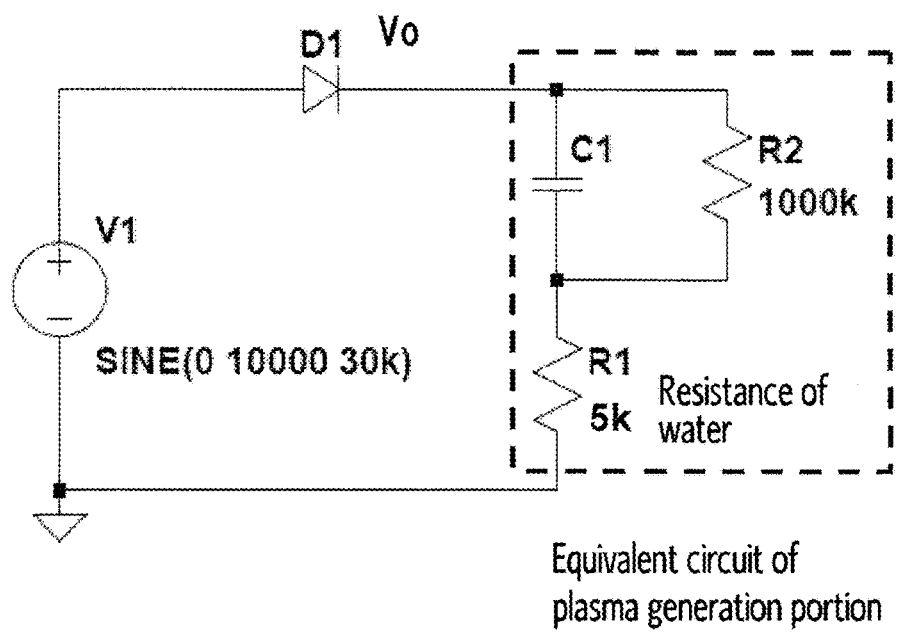
FIG. 32 is an equivalent circuit diagram of the device structure of the plasma generation part.
Figure 33:
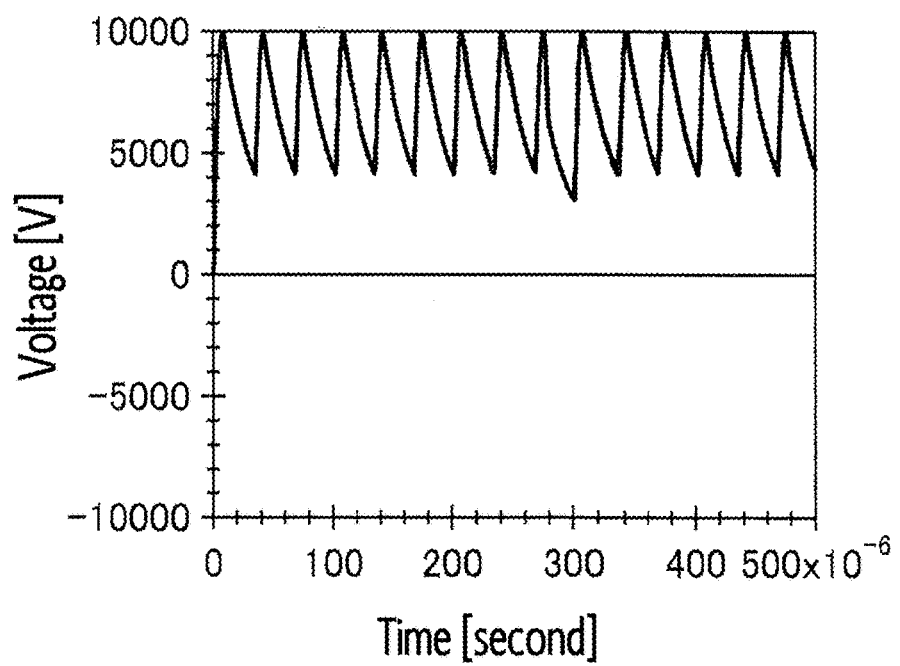
FIG. 33 is a graph showing voltage applied to the device structure when R1>R2 in the equivalent circuit diagram.
Figure 34:
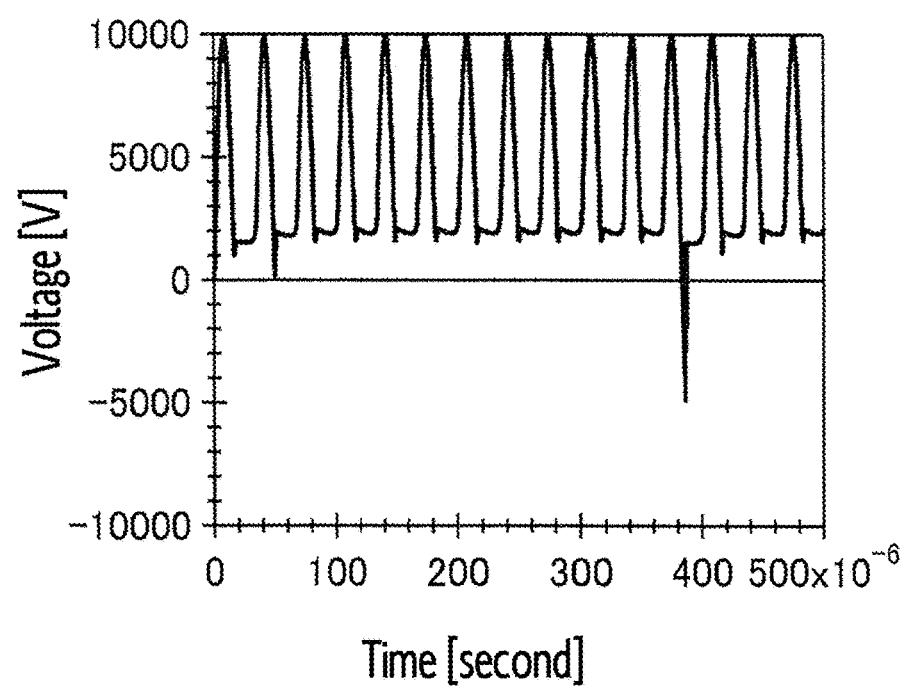
FIG. 34 is a graph showing voltage applied to the device structure when R1=R2 in the equivalent circuit diagram.
Figure 35:
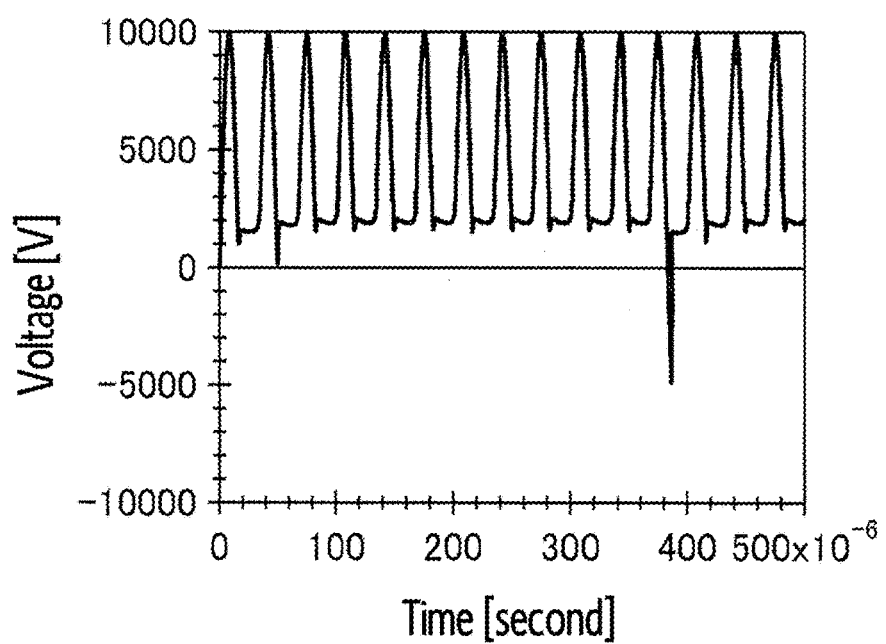
FIG. 35 is a graph showing voltage applied to the device structure when R1<R2 in the equivalent circuit diagram.

FIG. 32 shows the state where an AC voltage having a frequency of 30 kHz and a voltage of 10 kV is applied to the device configuration through a diode D1. The device portion including the plasma is represented by a capacitance C1 and a leakage resistance R2. The liquid portion is represented by a resistance R1, and this resistance varies depending on the conductivity of the liquid and the distance between the device and the counter electrode (the second electrode). For example, if the distance between electrodes is 1 cm, the resistance R1 of tap water of which conductivity 25 mS/m is a bulk resistance of about 5 kΩ and the resistance R1 of pure water is about 1 MΩ. Further, the leakage resistance is about 1 MΩ in the device configuration employed in the present embodiment. FIGS. 33 to 35 show the results of calculation for determining the voltage V0 with use of these circuit constants, wherein V0 is a voltage applied to the device. FIGS. 33, 34 and 35 show the voltages in the cases of bulk resistances of 1 kΩ, 1MΩ and 10MΩ, respectively.

Figure 36:
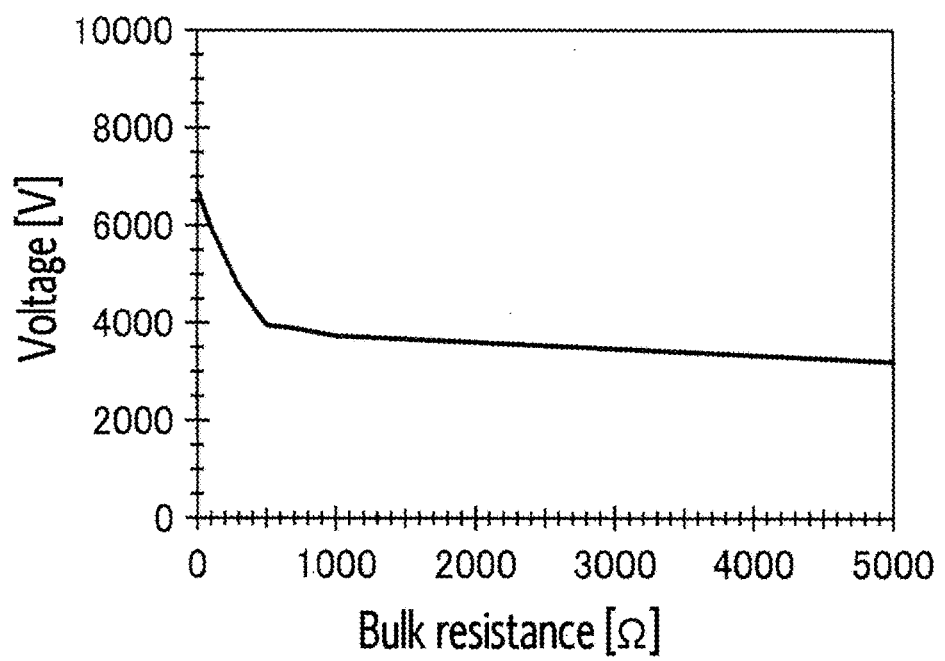
FIG. 36 is a graph showing relationship between R1 in the equivalent circuit diagram and the voltage applied to the device structure.

As shown in FIG. 33, when the bulk resistance is very small compared to the leakage resistance, a voltage of 4 kV is almost constantly applied to the device configuration and an average applied voltage is 6.7 kV. Thus, the plasma is stably generated since the voltage of 4 kV or more is constantly applied to the device. Next, the case where the conductivity of the water is small and the bulk resistance is 1MΩ is discussed. As shown in FIG. 34, the bulk resistance of 1 MΩ is of the same level as the leakage resistance. In this case, the voltage of 4 kV or more is not constantly applied, and the average voltage is 3.73V, resulting in instable plasma. However, when the inter-electrode distance is made 5 mm or less, the bulk resistance is 5 kΩ or less and the average voltage is about 4 kV be about, resulting in stable generation of plasma. When the bulk resistance is further increased to 10 kΩ as shown in FIG. 35, the applied voltage can be no longer maintained constantly at 4 kV, resulting in failure of stable generation of plasma. The change in average voltage relative to the bulk resistance is as shown in FIG. 36. In this case, the plasma can be generated by decreasing the inter-electrode distance in the same manner as described above.

The bulk resistance is, for example, equal to or less than 50% of the leakage resistance. If the bulk resistance is lower than the leakage resistance like that, the plasma can be generated stably with the average applied voltage of 4 kV or more.

If the diode is not provided, the AC voltage is applied as it is. However, the plasma was not able to be generated stably with the voltage of about 10 kV.

In the present embodiment, the inner diameter of the first electrode 104 was 0.4 mm and the outer diameter was 0.6 mm. However, the plasma can be formed when the inner diameter is 0.07 mm to 2.0 mm and the outer diameter is 0.1 mm to 3.0 mm. Further, the dimension (the length) of the first electrodes 104 in the treatment vessel 109 is not limited particularly. For example, in the treatment vessel 109, the first electrode 104 having the inner and outer diameters of the above-mentioned ranges may have a length of 0.1 mm to 25 mm. In this embodiment, the length of the portion of the first electrode 104 which portion is positioned in the treatment vessel 109 is about 10 mm. When the portion of the first electrode 104 which portion is positioned in the treatment vessel 109 is small, the bubble 106 formed near the opening portion of the first electrode 104 cannot spread in a direction toward the wall of the treatment vessel 109 (collides with the wall) and thereby an area of a gas-liquid interface is small, resulting in tendency of reduction in the plasma generation amount. However, plasma is generated as long as the first electrode 104 is positioned in the treatment vessel 109. In this way, tolerance for the size of the electrodes is also wide in the liquid-treating apparatus of the present embodiment.

[Effect (OH Radical Generation)]

FIG. 2 is a graph showing the results of measuring the emission characteristics of the plasma in the present embodiment by a spectrometer. The results are obtained in the case where the tap water is employed as the to-be-treated water 110, the water temperature is 26.5° C. and the conductivity is 20.3 mS/m. As shown in FIG. 2, light emission due to OH radicals generated by the decomposition of water is observed. In addition, the light emissions of $N_2$, N, H and O are observed. Emissions of $N_2$ and N are due to the supply of air as the gas in the to-be-treated water 110. In this manner, the plasma having the characteristics of both plasma formed in water and plasma formed in the air, is generated in the present embodiment.

[Effect (Decomposition Speed)]

Then, the effect on the to-be-treated liquid given by the liquid-treating apparatus of the present embodiment will be described. In the present embodiment, an aqueous indigocarmine solution was used as the model of the to-be-treated liquid. Indigocarmine is a water-soluble organic substance, and is often used as a model for polluted-water treatment. A concentration of the aqueous indigocarmine solution used in the present embodiment was 10 mg/liter, and the volume of the to-be-treated water 110 was 0.25 liter.

AS described above, OH radicals, N radicals, $N_2$ radicals, H radicals and O radicals are generated in the present embodiment. These radicals acts on indigocarmine and cut the binding in the molecule to decompose the indigocarmine molecule. As is generally known, an oxidation potential of the OH radical is 2.81 eV, being greater than those of ozone and chlorine. Thus, the OH radicals can decompose not only indigocarmine, but many organic substances. In addition, the bond energies between N radical and carbon and between the O radical and carbon are 1076 kJ/mol and 750 kJ/mol respectively, being much larger than the C—C bond energy of 618 kJ/mol and the C—H bond energy of 338 kJ/mol. Therefore, they contribute significantly to the decomposition of indigocarmine molecules. Further, N ions and $N_2$ ions are generated by the plasma due to the generation of the bubble 106 by air supply, and these ions collide with indigocarmine molecules. Since the collision of these ions weakens the inter-molecule bond of the indigocarmine molecule, the decomposition effects of the OH radicals, the O radicals, and N radicals are made much larger.

The decomposition degree of the indigocarmine molecule can be evaluated by absorbance of an aqueous solution thereof. It is generally known that blue of the aqueous indigocarmine solution is decolorized when the indigocarmine molecules are decomposed and the solution become transparent when the molecules are decomposed completely. This is because the absorption wavelength of the carbon double bond (C=C) is 608.2 nm and the C=C bond is cleaved by the decomposition of the indigocarmine molecule whereby light of 608.2 nm is not absorbed. Thus, the degree of decomposition of the indigocarmin molecules was evaluated by measuring the absorbance of light having a wavelength of 608.2 nm using an ultraviolet-visible light spectrophotometer.

In FIG. 3, the results of measuring the change in absorbance of the aqueous indigocarmine solution relative to the treated time are shown in a graph. The values of absorbance in FIG. 3 are ones normalized assuming that the absorbance of the untreated solution is 1. In FIG. 3, open circles show the results given by the liquid-treating apparatus of the present embodiment. In addition, as Comparative Examples 1 and 2, the results given by the conventional liquid-treating apparatuses are shown by black triangles and black squares.

In the conventional liquid-treating apparatus of Comparative Example 1, columnar electrodes of tungsten having an outer diameter of 0.16 mm were used as the first electrode 104 and the second electrode 102 and the end faces of these electrodes was opposed to each other with a distance of 2 mm in the indigocarmine solution. The results of treatment by this apparatus are shown by the black squares. Further, the black triangles show, as Comparative Example 2, the change in absorbance during the treatment wherein the same electrode configuration was employed and fine bubbles (diameter of about 0.3 mm) were continuously supplied between the first electrode 104 and the second electrode 102 from a nozzle provided separately. In these comparative examples, the power supplied to the first electrode 104 was set to 200 W similarly to the liquid-treating apparatus of the present embodiment.

As shown in FIG. 3, the liquid-treating apparatus of the present embodiment was able to decompose the aqueous indigocarmine solution almost completely within about 16 minutes. This was achieved by generating the OH radicals efficiently. On the other hand, in Comparative Example 1, it took 190 minutes to decompose the aqueous indigocarmine solution almost completely. Further, it took 50 minutes even in Comparative Example 2 wherein the bubbles were interposed between the electrodes. Thus, according to the liquid-treating apparatus according to the present embodiment, it is possible to generate plasma efficiently with the same input power and to treat the liquid in a short period of time.

Consideration of the conventional liquid-treating apparatuses as the comparative examples is as follows. It is considered that, in Comparative Example 1 wherein two electrodes are opposed with a distance of 2 mm, the amount of generated radicals is small since the plasma is generated in space of about 0.04 $mm^3$ between the electrodes. According to the detailed analysis of the inventors, it is found that bubbles are generated near the surfaces of the two opposed electrodes during the discharge in Comparative Example 1, and the plasma is generated inside the bubbles. Moreover, the bubbles are not always formed. When the bubbles are moved by buoyancy, the plasma is accordingly extinguished. Then, the formation of fresh bubbles and the generation of plasma inside the bubbles are repeated. That is, although it is possible to generate plasma by narrowing the distance between the electrodes and applying pulsed voltage, the plasma is not efficiently generated because of the intermittent generation of plasma and a small space in which the plasma is generated. For this reason, the decomposition time of the indigocarmine molecules is considered to be longer.

In the case where the bubbles are supplied through a nozzle from the outside, more bubbles are continuously interposed between the electrodes. Therefore, it is considered that more plasma is generated compared to the case where the bubbles are not supplied. However, the liquid-treating apparatus of the present embodiment can generate more plasma compared to the case where the bubbles are supplied from the outside, and gives pronounced effect of reducing the time for decomposing indigocarmine molecules to one third. It is considered that this is because the gas is continuously supplied to the to-be-treated water 110 at a relatively large flow rate from the end portion of the first electrode 104. That is, it is considered that this is because the end face of the surface of the first electrode 104 which surface is positioned in the liquid (the conductor-exposed surface) is covered with the gas within the bubble 106 by the supply of a large amount of gas during the discharge between the first electrode 104 and the second electrode 102, whereby the first electrode 104 does not contact directly with the to-be-treated water 110. It is considered that, as a result, a current path (or discharge path) consisting of only liquid is not formed in the treatment vessel, whereby a high voltage is applied to the gas-liquid interface without loss of voltage, leading to generation of much plasma. Detail will be described in a second embodiment.

In this embodiment, iron was used as a material for the second electrode 102 and the first electrode 104. These electrodes may be formed of tungsten, copper or aluminum or the like. Further, the insulator provided on the outer peripheral surface of the first electrode 104 may be formed by thermally spraying yttrium oxide. Yttrium oxide has higher resistance against plasma compared to titanium oxide. Therefore, the use of yttrium oxide gives the effect of increasing the electrode lifetime.

[Effect (Treatment with a Low Power)]

Figure 9:
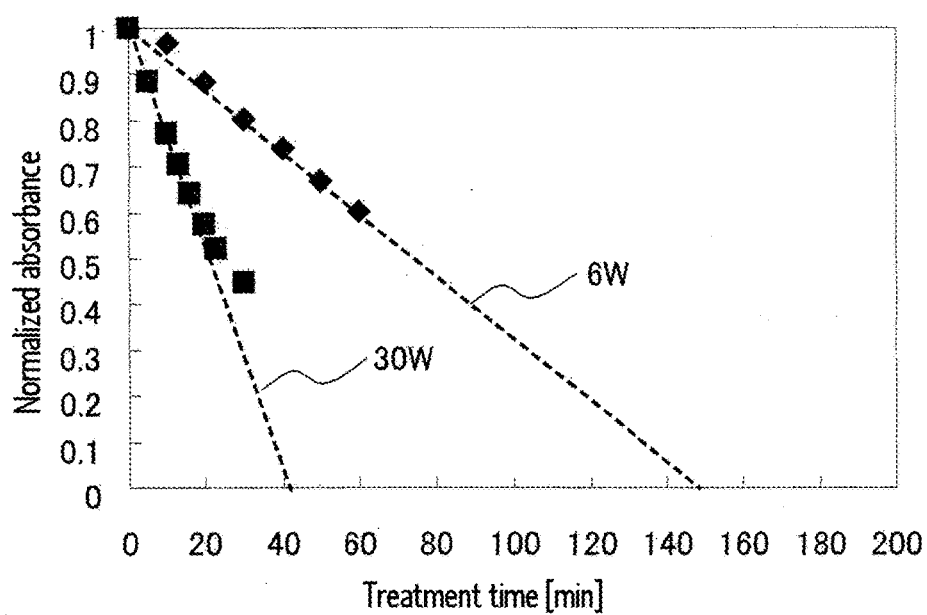
FIG. 9 is a graph showing change over time in transmittance of the aqueous indigocarmine solution in the first embodiment when power is varied.
Figure 10:
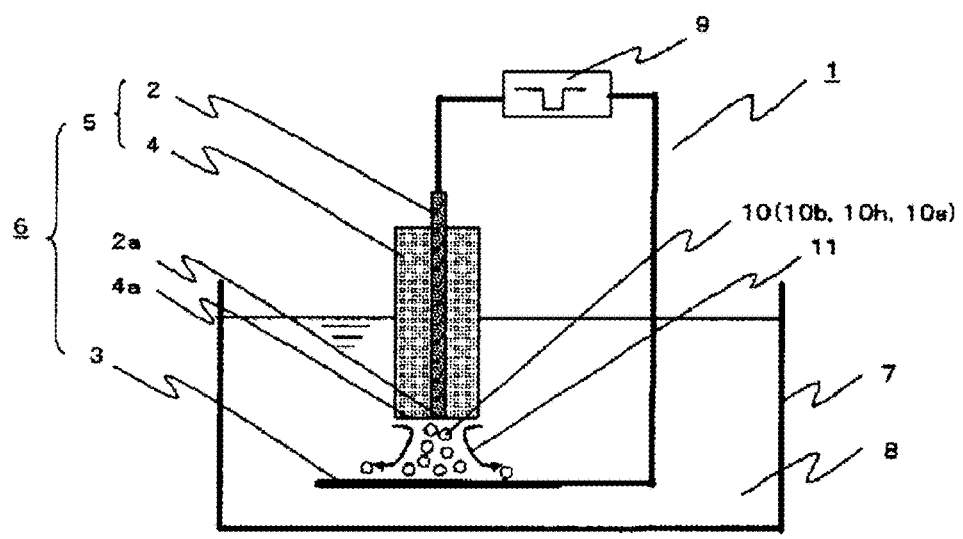
FIG. 10 is a configuration view of a conventional waste water treatment apparatus using high-voltage pulse discharge.

In the present embodiment, the change in time required for decolorizing blue of the aqueous indigocarmine solution was observed while the supplied power is varied. The flow rate was set to 2000 ml/min in the liquid-treating apparatus of the configuration as described above. Further, pulsed voltage having a peak voltage of 4 kV, a pulse duration of 500 μs, a frequency of 100 Hz and a power of 30 W was applied between the first electrode 104 and the second electrode 102, and the time required for decomposing the indigocarmine molecules in the aqueous solution was determined. Similarly, pulsed voltage having a pulse duration of 500 μs, a frequency of 100 Hz and a power of 6 W was applied between the first electrode 104 and the second electrode 102, and the time required for decomposing the indigocarmine molecules in the aqueous solution was determined. The results are shown in FIG. 9. A power supply of a different specification was used in order to reduce the set value of the power.

As shown in FIG. 9, as the power was smaller, the time required for decomposition was longer. However, the plasma was generated and the decomposition proceeded even when the power was about 30 W or 6 W. It is presumed that the time required for decomposition of all the indigocarmine molecules in the aqueous solution is 150 minutes when the power is 6 W, and this presumed time is shorter than the time required in Comparative Example 1 wherein the power was 200 W.

Further, in the treating apparatus of the configuration used in Comparative Example 1, the flash boiling phenomenon was not observed and the discharge did not occur since the power was not able to be input at all (6 W and 30 W was not able to be set), resulting in failure or plasma generation.

The liquid-treating apparatus of the present embodiment enables the liquid to be treated with a small power. Accordingly, the liquid-treating apparatus of this embodiment does not require high power (4000 W or more) such as required in the apparatuses described in JP 2009-255027 A and JP 2007-207540. Specifically, the power supply may be one of which maximum output capacity is more than 0 W and less than 1000 W in the liquid-treating apparatus of the present embodiment and the power over 1000 W is not required to be supplied. Such power can be obtained from the power supply of the household electric appliance. Thus, the liquid-treating apparatus according to the present embodiment is suitable for being incorporated into a household electric appliance in terms of power, and the unit consisting of the power supply and the pump can be made so small that it has the above-mentioned volume (1000 $cm^3$ to 5000 $cm^3$).

Further, in the case where the power of the above-mentioned range is supplied, the discharge between the electrodes is corona to glow discharge. When the plasma is generated by the glow discharge, the power consumption is lower compared with abnormal glow discharge and arc discharge and a large current is not required, and therefore the capacity of the power supply is made smaller and the deterioration of the electrode is reduced. For these reasons, there is an advantage that the price of the apparatus and the maintenance cost are reduced.

[Reference Embodiment]

A plasma-generating method is known wherein an electrode to which voltage is applied is not positioned in liquid and is positioned above a liquid level, a grounding electrode is positioned in the liquid, and plasma is generated on the liquid level by conducting discharge. This method and the present embodiment are in common in that the electrode to which voltage is applied is not in direct contact with the liquid. However, when the plasma is generated according to this method, ozone is generated. Ozone is an undesirable product. Further, in this method, there is a tendency that the area of the plasma in contact with the liquid becomes smaller, resulting in generation of a small amount of OH-radical. Further, there is a limit to the increase in the amount of the generated OH radical by increasing the number of the electrodes. This is because, even if a plurality of electrodes are arranged to increase the area of plasma, the distance between the electrode and the liquid level is narrow to be about 1 mm and the volume of plasma generated in the space therebetween is small, and the interface between the plasma and the water is thin. In addition, there is also a drawback that this method is difficult to be employed in a home appliance wherein the liquid level changes. The time for decolorization was about 45 minutes in experiment wherein 0.25 liters aqueous indigocarmine solution of 10 mg/L was treated applying power of 200 W with use of an electrode having a diameter of 1 mm. It is considered that this means that this method is poor in sterilization efficiency compared to the discharge obtained by using the liquid-treating apparatus of this embodiment. In addition, when the power is 30 W or 6 W, the decolorization speed is too slow to determine.

Second Embodiment

[Detailed Discussion of Electrode Configuration]

Figure 4:
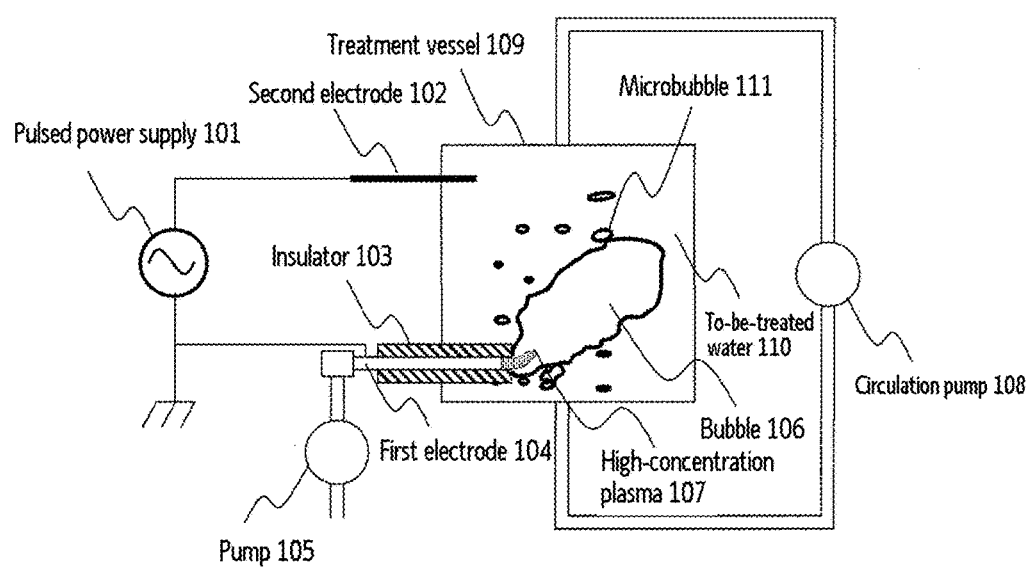
FIG. 4 is a configuration view of a liquid-treating apparatus in a second embodiment.
Figures 2, 4:
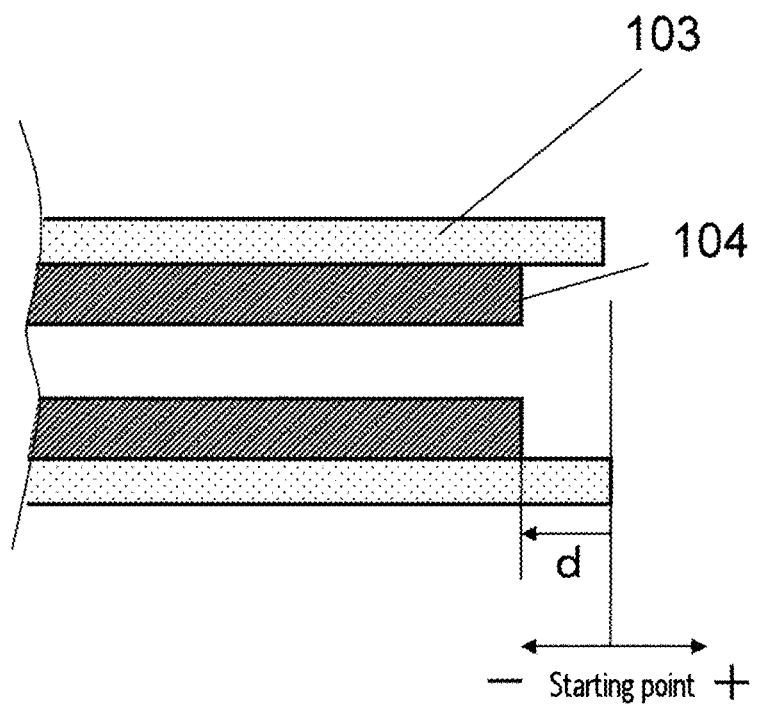
Figures 3, 4:
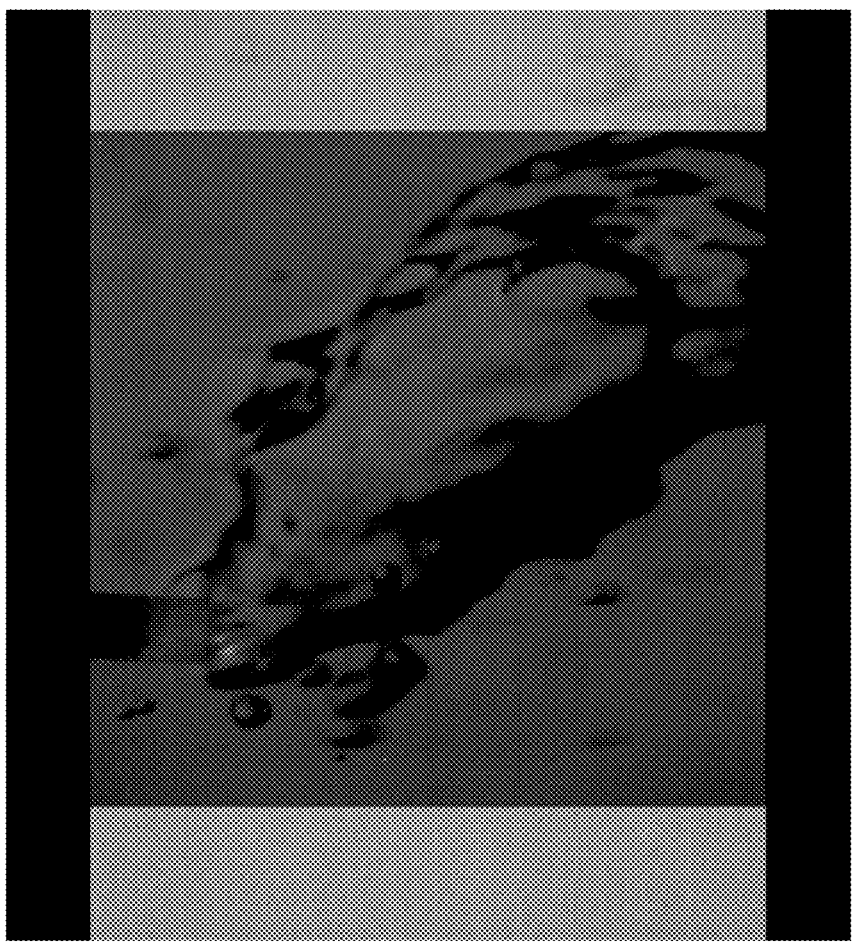

FIG. 4 is a diagram showing the overall configuration of a liquid-treating apparatus according to the present embodiment. The present embodiment is different from the first embodiment in that alumina ceramics of cylindrical shape is used as an insulator 103. The other structure is the same as that of the first embodiment.

FIG. 4-2 is an enlarged view of the vicinity of the opening portion of the first electrode 104. An alumina ceramic insulator 103 of cylindrical shape having an inner diameter of 0.6 mm and an outer diameter of 0.9 mm is disposed on and in closely contact with the outer peripheral surface of the first electrode 104. The insulator 103 is configured to be slidable relative to the first electrode 104. In the present embodiment, the positional relationship between the end face of the first electrode 104 and the end face of the insulator 103 is changed and the influence of this change on the treatment time of the to-be-treated liquid is examined. As shown in FIG. 4-2, the distance between the tip of the first electrode 104 and the tip of the insulator 103 is defined as "d", and "d" is represented by a positive value, when the tip of the first electrode 104 is protruded from the tip position of the insulator 103 as a base position, and "d" is represented by a negative value when the tip of the first electrode 104 is retracted inwardly.

Air of 2000 ml/min was supplied from the pump. Further, the second electrode 102 was grounded and pulsed voltage having a peak voltage of 4 kV, a pulse duration of 1 μs, a frequency of 30 kHz and a power of 200 W was applied to the first electrode 104.

Figure 5:
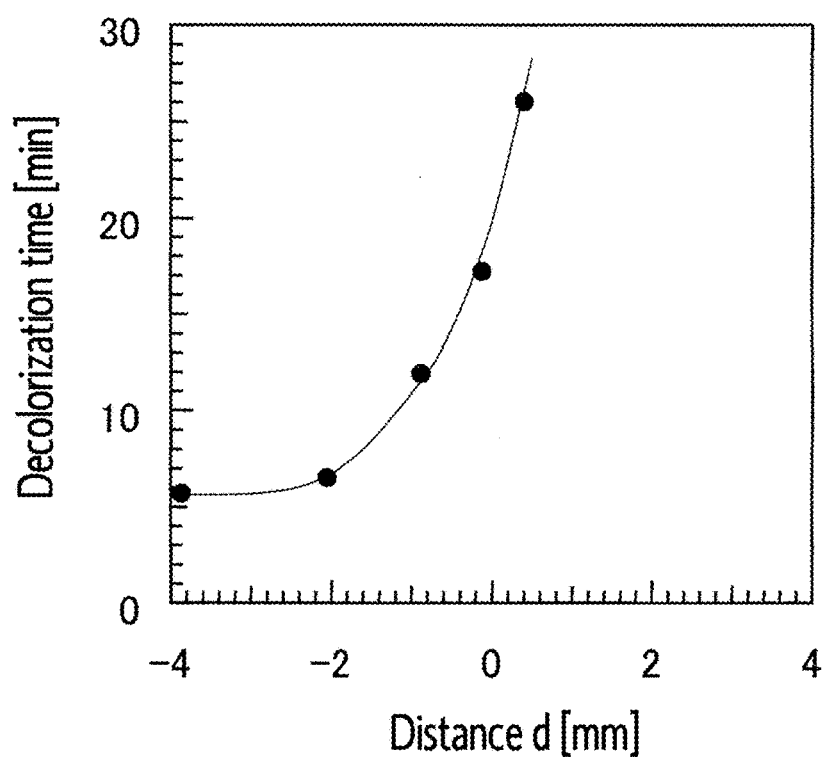
FIG. 5 is a graph showing relationship between complete decolorization time of an aqueous indigocarmine solution and a distance between an end face of insulator and an end face of the second electrode in the second embodiment.

The graph of FIG. 5 shows relationship between time required for complete decolorization of an aqueous indigo-carmine solution and the distance "d". As show in FIG. 5, it is understood that, as the distance "d" is changed from a positive value to a negative value, the decolorization time is shortened quickly and the decomposition of indigocarmin makes progress. In particular, the disclorization time is significantly reduced when the distance "d" is changed from a positive value to −2 mm. This is because the tip of the first electrode 104 is more likely to be covered by the supplied air as a result of retraction of the tip of the first electrode 104 from the tip of the insulator 103. When the tip portion of the first electrode 104 is covered with the gas, the first electrode 104 is not in direct contact with the to-be-treated water 110 since the bubble 106 and the insulator 103 are interposed between the first electrode 104 and the to-be-treated water 110. As a result, no current path consisting only of the to-be-treated water 110 exist between the first electrode 104 and the second electrode 102. Therefore, the pulsed voltage applied to the first electrode 104 is applied to the bubble 106 without leaking to the to-be-treated water 110, resulting in efficient generation of plasma.

The decolorization time is not so changed, when the distance "d" is −2 mm or less. Further, when the distance "d" is −4 mm or less, the length of the interface between the gas and the water is rather long to make discharge difficult. Therefore, the plasma is difficult to decompose water, resulting in reduction in amount of the OH radicals. Thus, this is not to say that it is favorable that the end face of the first electrode 104 is simply farther away from the to-be-treated water 110. The optimal distance "d" depends on the amount of gas supplied and the dimension and shape of the first electrode.

Further, in the case where the position of the end face of the opening portion of the first electrode was positioned outside the end face of the insulator at the start of the voltage application and was moved relatively more inside than the end face of the insulator after the generation of plasma, the decolorization time was not long even if the distance "d" after the movement was −4 mm or less. It is considered that this is because the plasma generation was started in the state where the opening portion of the first electrode 104 was positioned within the bubble 106 and covered with the gas in the bubble 106 that was formed in the to-be-treated water 110. That is, it is considered that this is because the volume of the plasma protruded in the water when "d" was changed to −4 mm or less after the generation of the plasma, was not changed from the volume of the plasma protruded in the water when "d" was −2 mm, and therefore the amount of the radicals was not so changed.

Further, when the first electrode 104 is moved relatively to the insulator 103 to obtain a minus value of "d", there is an advantage of stable discharge with a small and stable voltage loss since the first electrode 104 is hardly wet by water. That is, it is possible to conduct stable discharge by moving the end face of the opening portion of the first electrode 104 in the direction toward the inner side than the end face or the insulator 103 after applying a voltage between the first electrode 104 and the second electrode 102 by the power supply. The relative movement of the first electrode 104 to the insulator 103 may be performed by moving the insulator 103, or by moving the first electrode 104.

The bubble state was observed with a high-speed camera while varying the distance "d". As shown in FIG. 4-3, when "d" is −2 mm, the surface of the bubble is less smooth compared to the first embodiment shown in FIG. 1 and many convexities and concavities are generated in the surface due to the shock wave caused by the plasma. Further, a part of the bubble is separated by the shock wave at the same time and thereby micro bubbles 111 are generated. This is due to the fact that the end face of the first electrode 104 is away from the to-be-treated water 110 and thereby a higher voltage is applied to the interface between the gas and the liquid in a moment.

Third Embodiment

[Overall Configuration]

Figure 6:
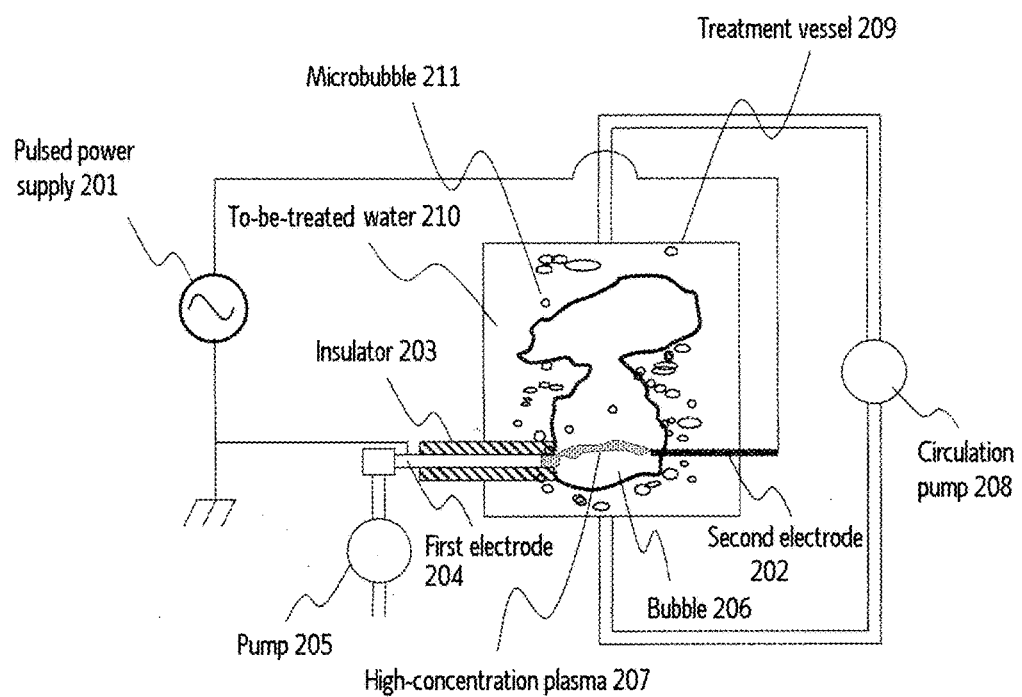
FIG. 6 is a configuration view of a liquid-treating apparatus in a third embodiment.

FIG. 6 is a configurational view of a liquid-treating apparatus of the present embodiment. In the present embodiment, the configuration is made such that a part of the second electrode 202 contacts with a bubble 206 or a part of the second electrode 202 is positioned within the bubble 206. The other configuration is the same as the first embodiment. In FIG. 6, a numeral having the same last two digits as those of the numeral in FIG. 1 denotes the same element or member denoted by the numeral in FIG. 1.

Air of 2000 ml/min was supplied from the pump. Further, the second electrode 202 was grounded and pulsed voltage having a peak voltage of 4 kV, a pulse duration of 1 μs, a frequency of 30 kHz and a power of 200 W is applied to the first electrode 204.

Figure 7:
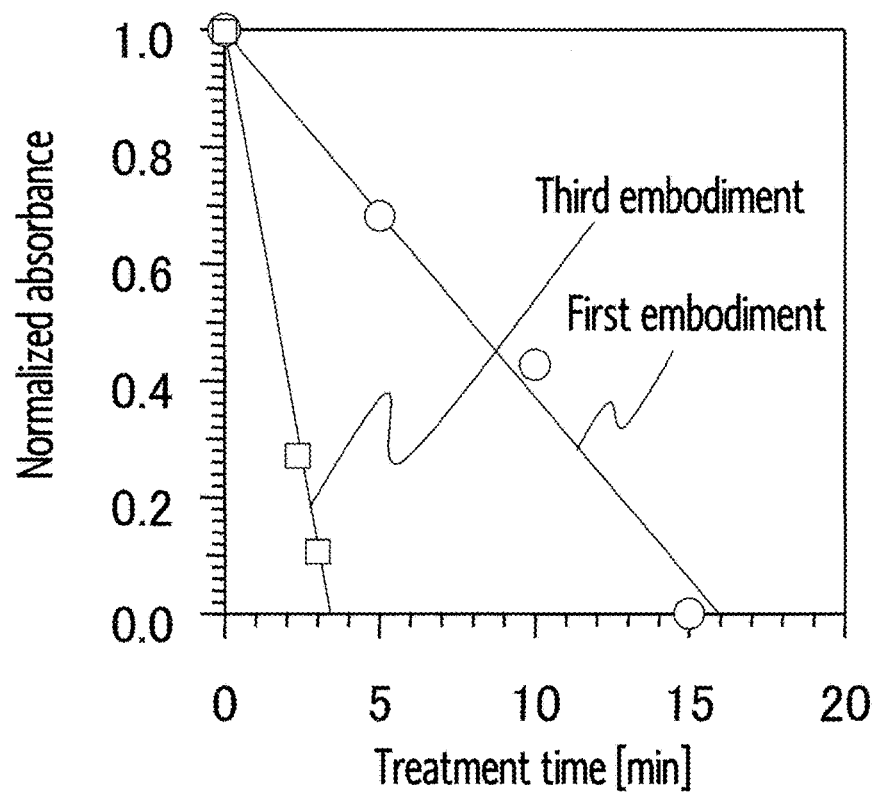
FIG. 7 is a graph showing change over time in transmittance of the aqueous indigocarmine solution in the third embodiment.
Figures 2, 7:
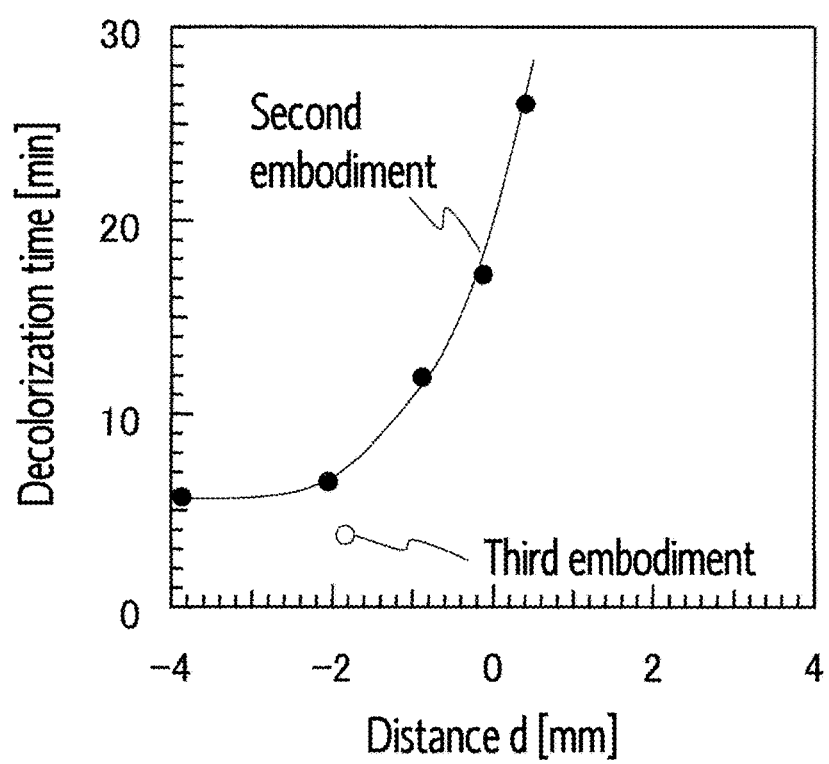
Figures 3, 7:
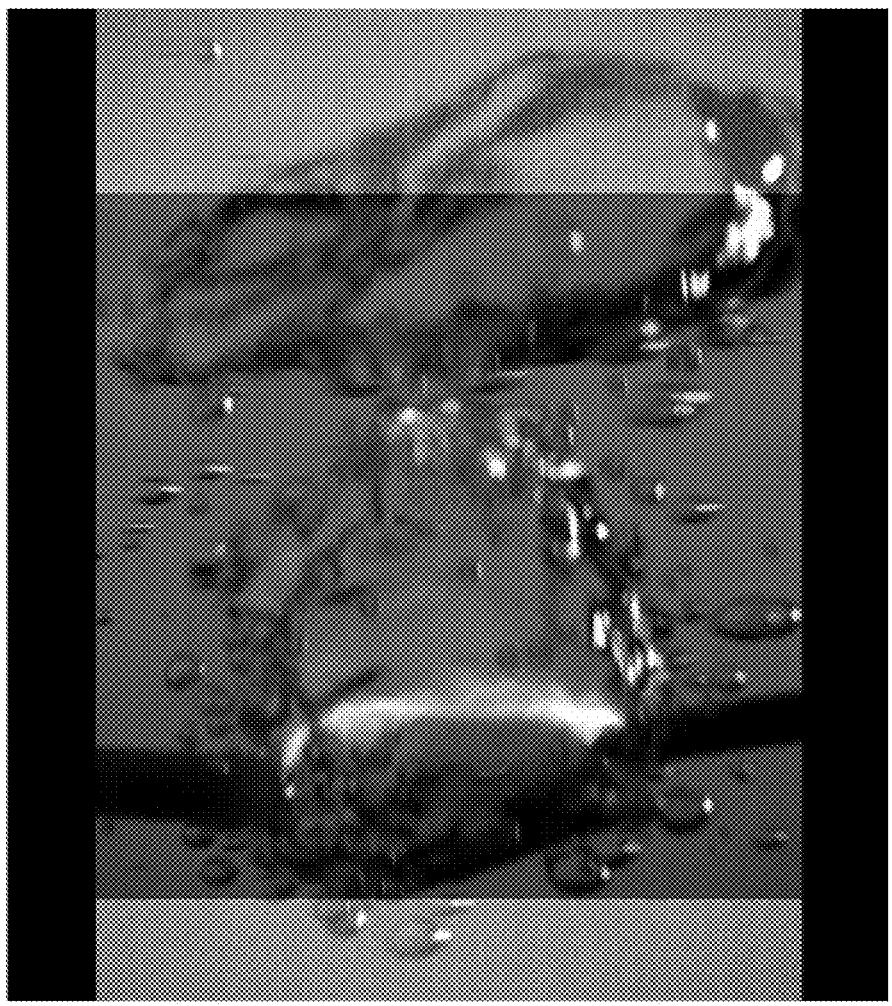

In the present embodiment, the state of bubble was observed with a high-speed camera. As shown in FIG. 7-3, the surface of the bubble 206 is not smooth and many convexities and concavities are generated in the surface due to the shock wave caused by the plasma. Further, a part of the bubble is separated by the shock wave at the same time and thereby micro bubbles 211 are generated. In comparison with the first embodiment shown in FIG. 1, the number of microbubbles generated is overwhelmingly large.

[Effect]

FIG. 7 is a graph showing the results of measurement of change in absorbance of an aqueous indigocarmine solution to the treatment time in the present embodiment. In FIG. 7, open squares are measurement results for the present embodiment. Further, white circles are measurement results for the first embodiment. Power of 200 W was supplied between each of the first electrodes 204, 104 and each of the second electrode 202, 102.

Figure 8:
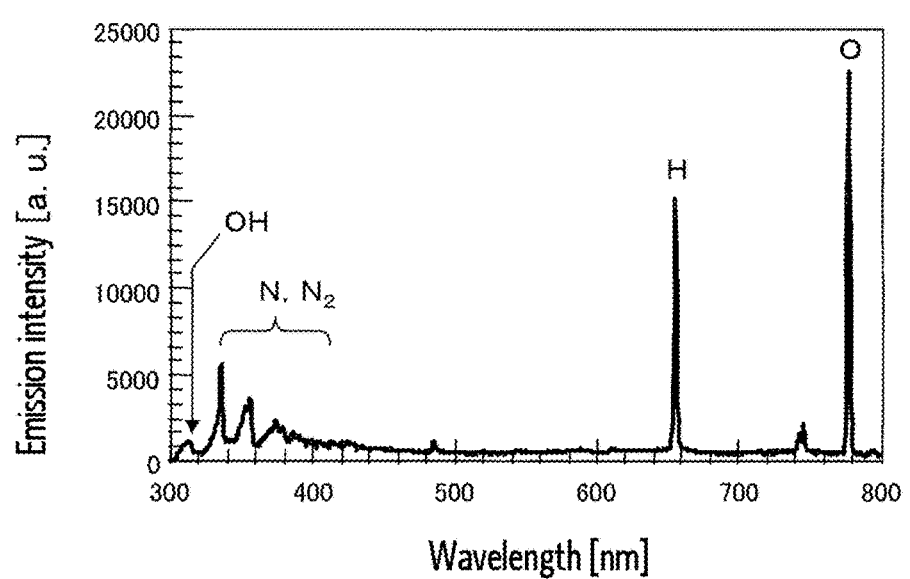
FIG. 8 is a graph showing spectral characteristics of plasma generated in the third embodiment.

As shown in FIG. 7, the time required for decomposing the aqueous indigocarmine solution completely in the present embodiment was 3 minutes and 30 seconds. On the other hand, the time required for decomposing the aqueous indigocarmine solution in the first embodiment was about 16 minutes. That is, it is found that the configuration of the present embodiment can reduce the treatment time to a quarter or less of the treatment time required in the configuration of the first embodiment. This is because the voltage is not lost (that is, the current does not escape in the liquid) and higher voltage is applied to the gas inside the bubble as well as to the interface between the bubble and the solution due to the fact that the electrode 202 is in contact with or positioned in the bubble. Accordingly, a higher plasma density is obtained and more O and H radicals are generated, whereby the treatment is completed in a short time, as shown in FIG. 8. Furthermore, a shock wave generated by strong electric field acts on the interface between the bubble and the solution to separate a part of the bubble, resulting in generation of microbubbles. Since the microbubbles contain the OH radicals and the O radicals and these radicals are diffused over the entire solution by the micro-bubbles, the decomposition of the indigocarmine is further prompted. In this manner, the present embodiment can conduct the degradation of microorganism and bacteria efficiently by utilizing the shock wave.

Further, in a variation of the present embodiment, the influence on the treatment time of the to-be-treated liquid was observed by using the insulator 203 of cylindrical alumina ceramics which is movable relative to the electrode 204 and changing the positional relationship between the end face of the first electrode 204 and the end face of the insulator 203 similarly to the second embodiment. In this variation, the end face of the first electrode 204 is positioned about 2 mm inwardly from the end face of the insulator 203, and the absorbance of the to-be-treated liquid is determined while the plasma is generated.

The results are shown in FIG. 7-2. It is found that the variation of this embodiment further shortened the decolorization time compared to the second embodiment as shown in FIG. 7-2. From this result, it can be said that the voltage is not lost and higher voltage is applied to the gas inside the bubble and to the interface between the bubble and the solution, due to the fact that the second electrode 202 is in contact with or placed within the bubble.

Fourth Embodiment

In the present embodiment, an embodiment will be described wherein the liquid treating efficiency for the input power is improved.

Figure 11:
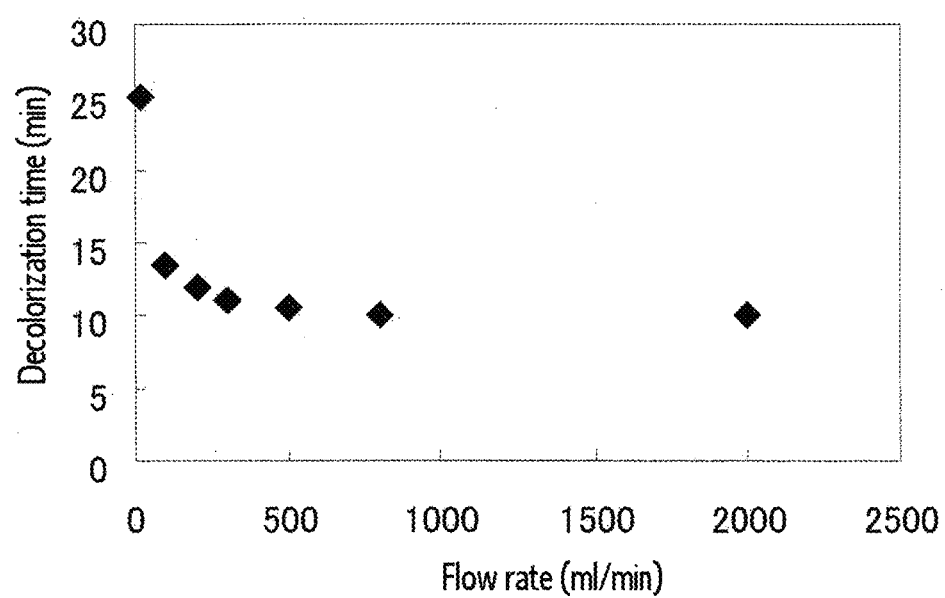
FIG. 11 is a graph showing relationship between complete declorization time of the aqueous indigocarmine solution and a flow rate of gas in the second embodiment (d=−2 mm).

In the present embodiment, a liquid-treating apparatus of the same configuration as that of the second embodiment was used, wherein the first metal electrode is a cylindrical electrode of a metal having an inner diameter of 1 mm and an outer diameter of 2 mm and a cylindrical insulator of alumina ceramics having an inner diameter of 2 mm and an outer diameter of 3 mm is disposed on the outer peripheral surface of the first electrode 104 such that gap is not formed therebetween. FIG. 11 shows the relationship between the flow rate of the gas and the time for decolorizing an aqueous indigocarmin solution as the to-be-treated liquid when the flow rate of the gas (air) supplied from the gas-supplying apparatus with the tip of the first electrode retracted inwardly 2 mm from the tip of the insulator inwardly. As shown in FIG. 11, the decolorization time is saturated at the flow rate over a certain level, but the time required for liquid treatment is increased at the flow rate equal to or under a certain level.

Figure 12:
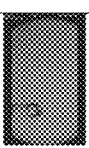
FIG. 12 is a photograph showing vicinity of a tip of the first electrode in the liquid-treating apparatus in the second embodiment (d=−2 mm).

FIG. 12 is a high-speed camera image of the vicinity of a tip of the first electrode in a state where the tip of the first electrode is retracted inwardly 2 mm from the tip of the insulator. In each image, it is observed that there is an electrode in the left side and the bubble is formed on and from the tip. FIG. 12 shows images of the bubbles which are generated at the respective flow rates shown in the results of FIG. 11. Further, in FIG. 12, images taken 30 ms, 60 ms, 90 ms, and 120 ms after the reference time are representatively shown. Based on these results of shooting, the ratio of time for which the electrode was covered by the gas to a predetermined time was calculated. Specifically, the number of the total images including the images (photographs) not shown in FIG. 12 and the number of the images (photographs) in which the surface where the conductor is exposed, of the first electrode is positioned within the bubble were counted, and calculation was conducted based on the following formula. Whether the surface where the conductor is exposed is positioned within the first electrode or not is judged by visual observation.

Electrode coverage (%)=[the number of images wherein the conductor–exposed surface of the first electrode is positioned within the bubble/ the total number of the images]×100

Figure 13:
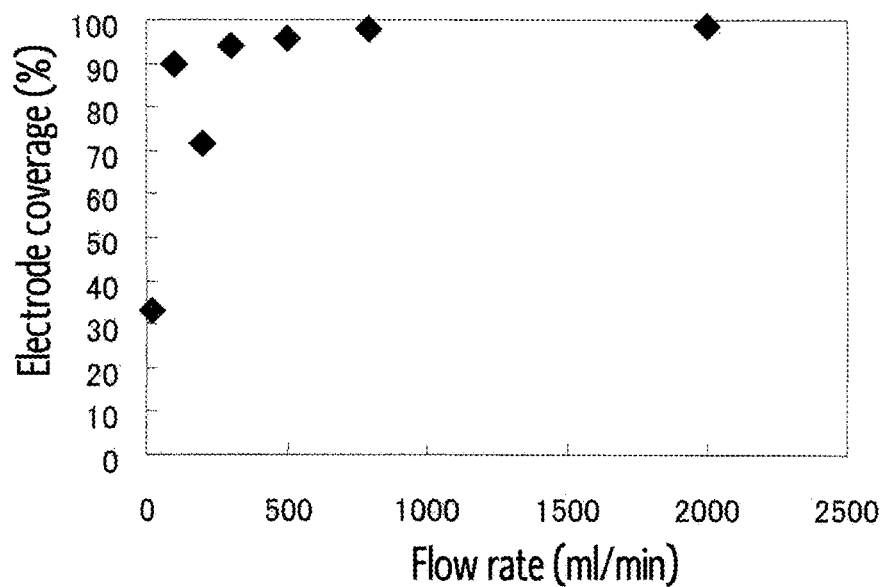
FIG. 13 is a graph showing a relationship between a fraction of electrode coverage and a flow rage of a gas.

FIG. 13 shows the results.

Comparing the results of FIG. 11 and the results of FIG. 13, it is found that there is a strong correlation between the electrode coverage with bubble and the liquid treatment time. The reduction in the flow rate causes the reduction in the electrode coverage, which involves the reduction in frequency of plasma discharge. For this reason, it is considered that the time required for liquid treatment is increased. Further, the voltage is applied continuously for about 70% of the time during which the bubble is not formed under the condition, for example, of 20 ml/ml. Since the voltage applied during the time for which the bubble is not formed does not contribute to the discharge, this means that the power is wasted during the time for which the bubble is not formed.

In order to reduce the wasteful consumption of power, the liquid treatment efficiency to the input power is increased in the present embodiment by controlling the operation timing of the pump as the gas-supplying apparatus and/or the power supply.

Figure 14:
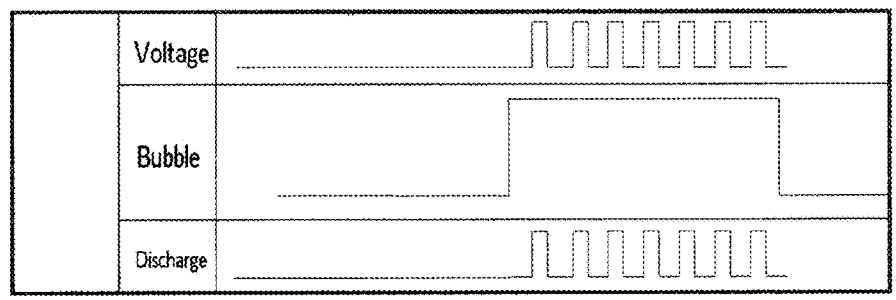
FIG. 14 is conceptual diagram showing operation of a liquid-treating apparatus in a fourth embodiment.
Figure 15:
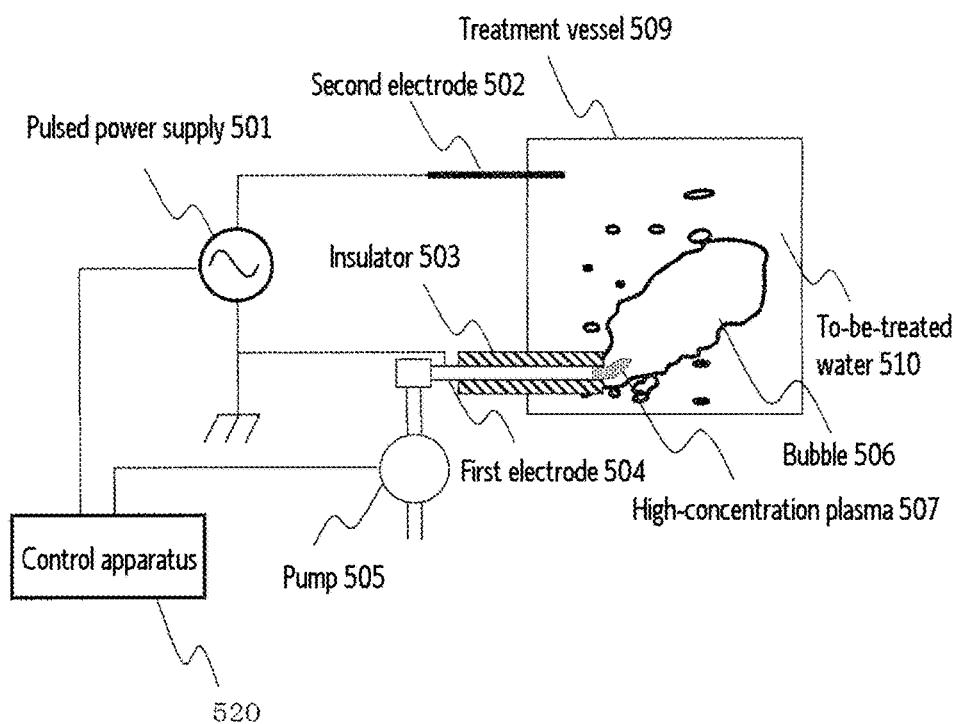
FIG. 15 is a configuration view of the liquid-treating apparatus in the fourth embodiment.

FIG. 15 is an overall configuration view of the liquid-treating apparatus of the present embodiment. The configuration of the present embodiment is substantially the same as that of the second embodiment except that a control apparatus 520 is provided for controlling a pump 505 and a power supply 501 and no circulation pump is provided. The operation of the liquid-treating apparatus of the present embodiment will be described with reference to FIG. 14. FIG. 14 schematically shows the voltage applied to the electrode, the bubble around the electrode, and the plasma. Since FIG. 14 is a schematic view, it does not correspond to the actual pulse duration and so on.

Firstly, the control apparatus 520 actuates the pump 505 such that the gas is supplied into the to-be-treated water 510 through an opening portion of one end of the first electrode 504 which end is positioned in the treatment vessel. A bubble 506 almost continuously covers the end portion of the first electrode 504 by using the flow rate of 2000 ml/min in the present embodiment. The flow rate required for forming the bubble depends on the shape of the electrode, and therefore it may be selected depending on the shape.

When a predetermined period of time passes after the start of operation of the pump 505, a state where the surface where the conductor is exposed, of the electrode 504 is always covered with the bubble 506 is achieved. After reaching this state, the control apparatus 520 actuates (turns on) the power supply 501 to apply the voltage between the first electrode 504 and the second electrode 502. Plasma 507 is generated in the vicinity of the electrode 504 by application of the voltage between the first electrode 504 and the second electrode 502.

On the other hand, when the liquid-treating apparatus is stopped (turned off), the control apparatus 520 stops the power supply 501. Next, the control apparatus 520 stops the operation of the pump 505. In the case where there is a time lag between a time when the pump 505 is stopped and a time when the bubble does not cover the surface where the conductor is exposed, of the first electrode 501, the pump may be stopped earlier considering this time lag. That is, the power supply 501 may be controlled such that power supply 501 reaches an output stop state earlier than the time when the bubble does not cover the surface where the conductor is exposed, of the first electrode 501 and the exposed surface contacts directly with the liquid. This makes it possible to reduce the loss of power consumption before and after the discharge.

Figure 31:
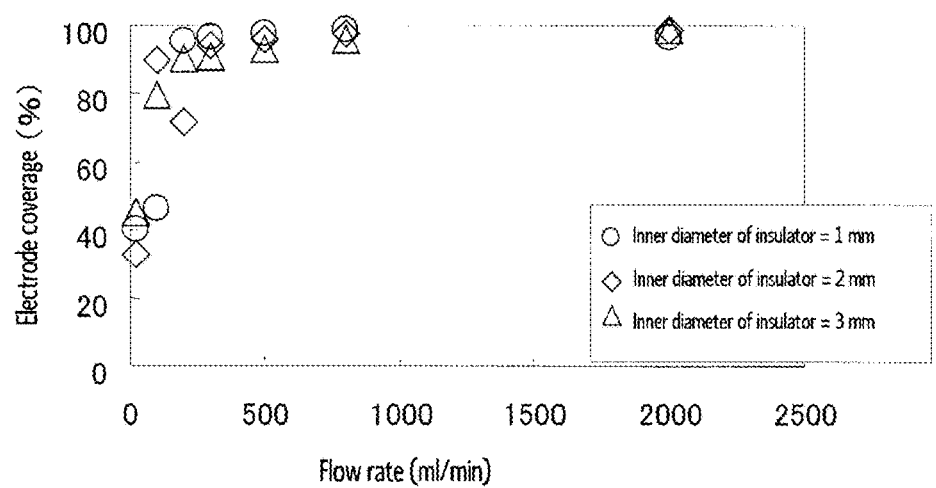
FIG. 31 is a graph showing relationship between an inner diameter of insulator (alumina ceramic) and the electrode coverage.

In the present embodiment, the electrode coverage was determined similarly by varying the inner diameter of the alumina ceramics (that is, the outer diameter of the first metal electrode 104) within a range of 1 mm to 3 mm and varying the inner diameter of the first electrode 104 from 0.3 mm to 2 mm. The results are shown in FIG. 31. When the inner diameter of the first electrode was changed within this range, significant change in the electrode coverage was not observed.

In the present embodiment, the configuration wherein the control apparatus was added to the liquid-treating apparatus of the first embodiment has been described. The control apparatus can be also applied to the second and the third embodiments.

Fifth Embodiment

In the present embodiment, an embodiment wherein the liquid treatment efficiency relative to the input power is improved when the flow rate of the gas supplied from the pump is reduced, will be described.

The present embodiment is different from the fourth embodiment in that a bubble detection device is used. Other configuration is the same as that of the fourth embodiment unless otherwise specified.

[Overall Configuration]

Figure 16:
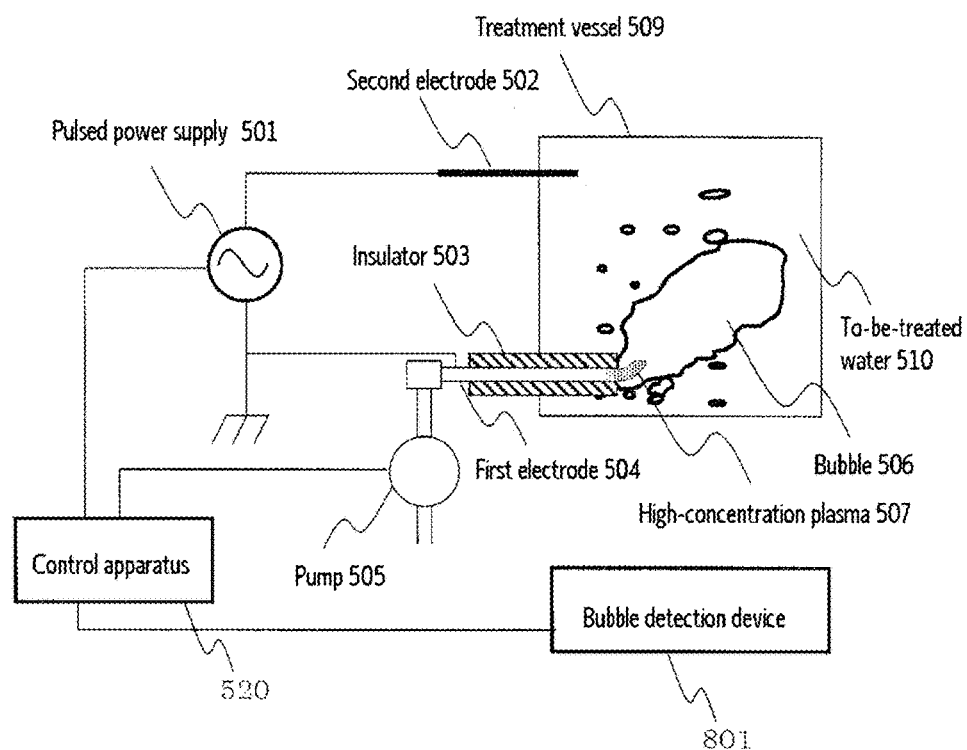
FIG. 16 is a configuration view of a liquid-treating apparatus in a fifth embodiment.

The configuration of this embodiment will be described with reference to FIG. 16.

In the present embodiment, a bubble detection device 801 is used in addition to the configuration of the fourth embodiment. For example, if the formation and disappearance of bubble are known in advance, the power supply can be controlled in the manner as described in the fourth embodiment. However, it is not necessarily possible to know the formation and disappearance of the bubble in advance. Therefore, in the present embodiment, the bubble detection is performed using the bubble detection device, and the control of power supply is linked to the detection.

In the present embodiment, a high-speed camera can be used as the bubble detection device 801. The high-speed camera is set to focus on the bubble 506 in the vicinity of the first electrode 504. As shown in FIG. 12, the presence or absence of bubble can be confirmed by the high-speed camera. The presence or absence of bubble is judged using a predetermined algorithm and the judgment results are transferred to the control apparatus 520. The control apparatus 520 gives the feedback to the power supply 501 based on the judgment results of the bubble detection device 801. For example, whether or not the bubble 506 exists near the first electrode 504 is judged using a processing unit from the contrast of image which is taken by the high-speed camera, and the judgment results can be fed back to the control apparatus 520. Further, it is possible to determine the presence or absence of the bubble by detecting the edge of the bubble (the interface between the gas and the liquid). It is possible to use a known image-detecting method as the method for detecting the bubble. Thereby, the application of voltage can be performed only when the bubble is present, resulting in elimination of wasteful power consumption.

Figure 17A:
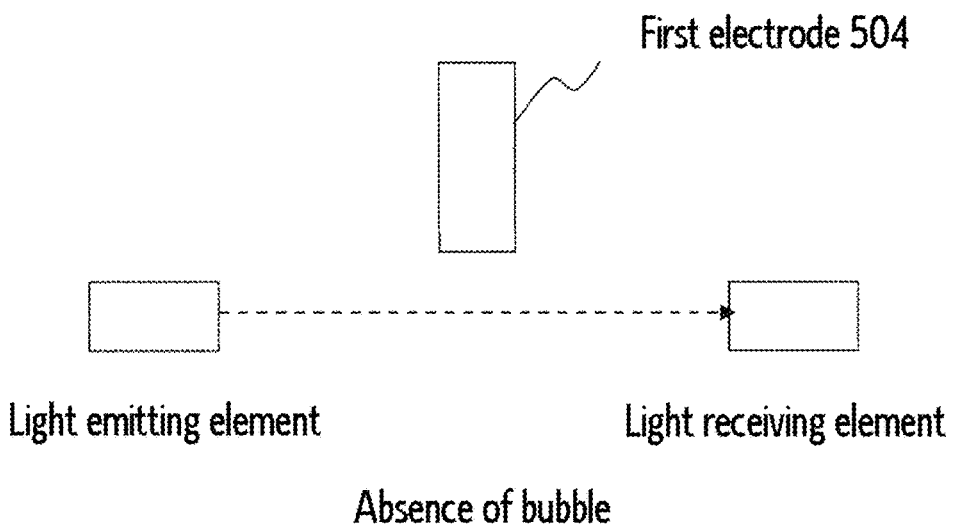
FIGS. 17(a) and (b) are schematic views showing a bubble detection method wherein a light-emitting element and a light-receiving element are used.
Figure 17B:
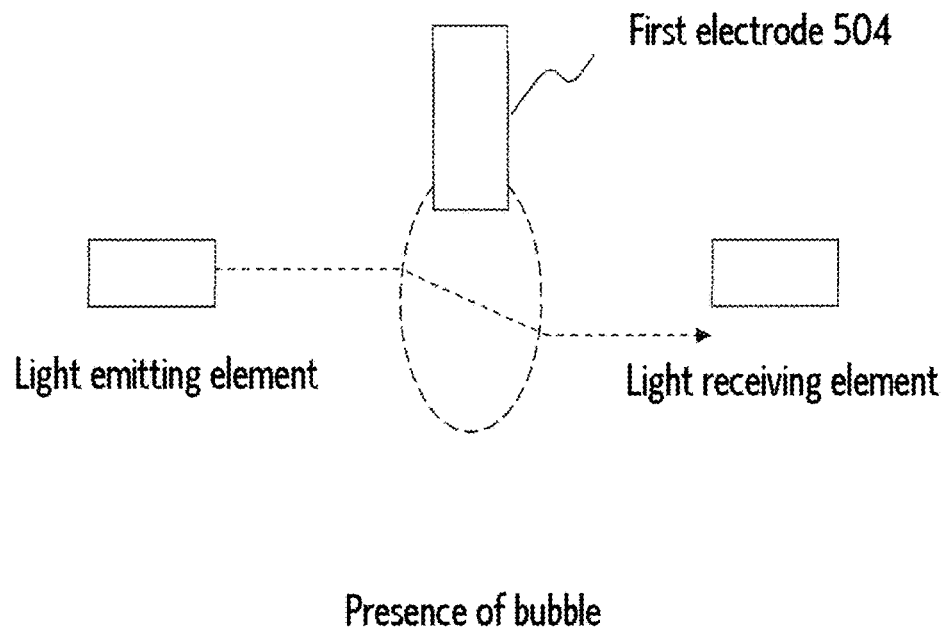

Alternatively, a light-emitting element and a light-receiving element can be used as the bubble detection device. For example, a semiconductor laser or a light-emitting diode (LED) may be used as the light-emitting element and a photodiode may be used as a light-receiving element. FIG. 17 schematically shows a method for detecting bubble by means of a bubble detection device wherein the light-emitting element and the light-receiving element are used. The light-emitting element is arranged such that an optical path of the laser is positioned near the bubble at the tip of the first electrode 504. The light-receiving element is positioned at a place where it can receive light when the bubble is absent (FIG. 17 (*a*)). When the bubble is generated, the refractive index is changed causing the laser optical path to be changed, and thereby the amount of light received by the light-receiving element is varied (FIG. 17(*b*)). Although the plasma discharge generates light which may be a cause of interference with the light detection means, such interference can be avoided by selecting conditions in advance. For example, it is possible to set a wavelength of the semiconductor laser such that it does not interfere with the plasma discharge spectrum. A predetermined value is set as a threshold value and the signals of the light-receiving element are transmitted to the control apparatus. The control apparatus gives the feedback to the power supply based on the results of the bubble detection device. This makes it possible to eliminate wasteful power consumption. The use of the optical detection device makes it possible to construct the bubble detection device at a relatively low cost.

Figure 20:
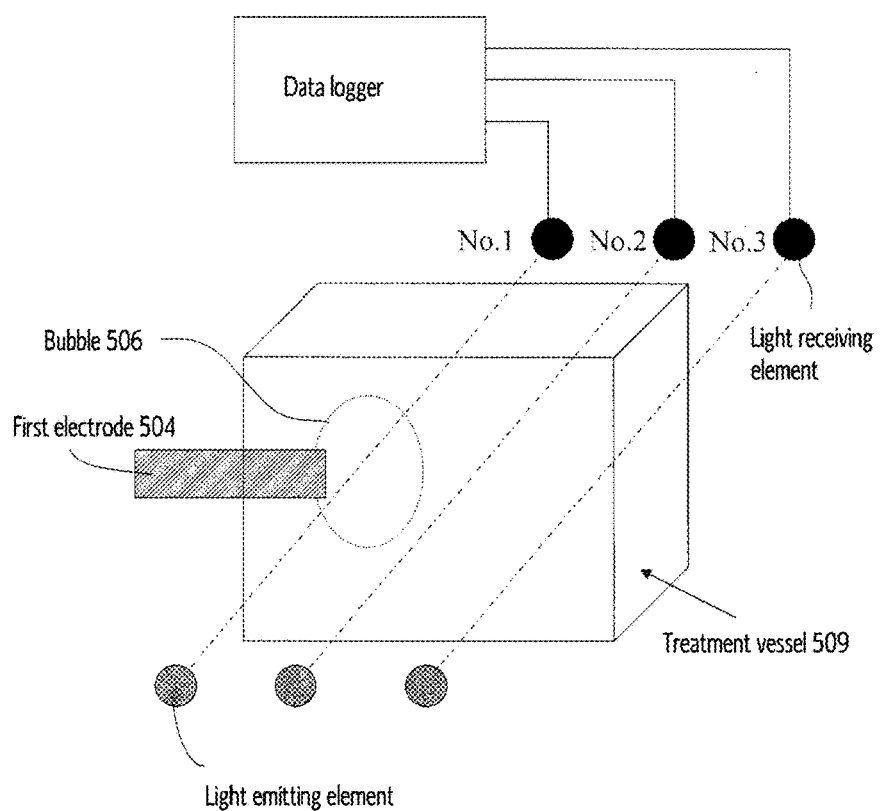
FIG. 20 is a schematic view showing another example of a bubble-detecting method wherein a light-emitting element and a light-receiving element are used as the bubble detection device.

An example of bubble detection with use of a light-emitting element and a light-receiving element as the bubble detection device, will be described below. As shown in FIG. 20, a light-emitting diode was positioned on one side of a transparent treatment vessel such that the central optical path of the light emitting diode which was a light-emitting element (central wavelength 610 nm) was positioned near the bubble at the tip portion of the electrode. In addition, an illuminance sensor, as the light-receiving element, which received the light from the light-emitting diode and determined the light quantity thereof was positioned on the side opposite to the side on which the light-emitting diode was positioned such that the sensitivity of the sensor was maximized under the condition where the bubble was not present. Three pairs of light-emitting diode and illuminance sensor were placed as shown in FIG. 20. Further, a distance between adjacent pairs was 1 cm. In FIG. 20, the pairs of the light-emitting diode and the illuminance sensor are numbered as Nos. 1 to 3 from the position close to the electrode.

The voltage generated by the illuminance sensor is changed depending on the amount of received light. Then, the voltage generated by the illuminance sensor was detected using a commercial data logger, and the voltage change due to the presence or absence of bubble was determined. The determination was conducted with a 100 ms interval. No optical filter was used in the illuminance sensor. Introduction of bubble and a power supply for the light-emitting diodes are controlled as shown in Table 1.

TABLE 1

| Time (s) | Bubble generation | LED |
|---|---|---|
| 0-4 | Absent | OFF |
| 4-9 | Present | ON |
| 9-12.5 | Absent | ON |
| 12.5-20 | Present | ON |

Figure 21A:
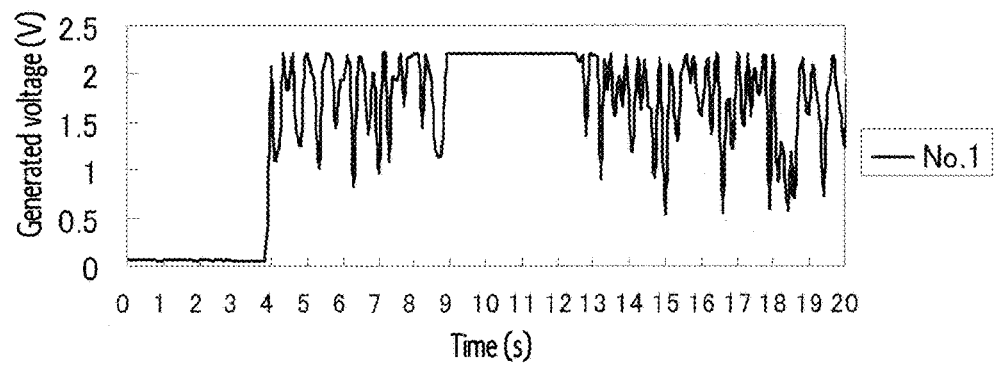
FIG. 21(a) is a graph showing change in light-emitting voltage of the light-receiving element of a pair referred to as "No. 1" in FIG. 20.
Figure 21B:
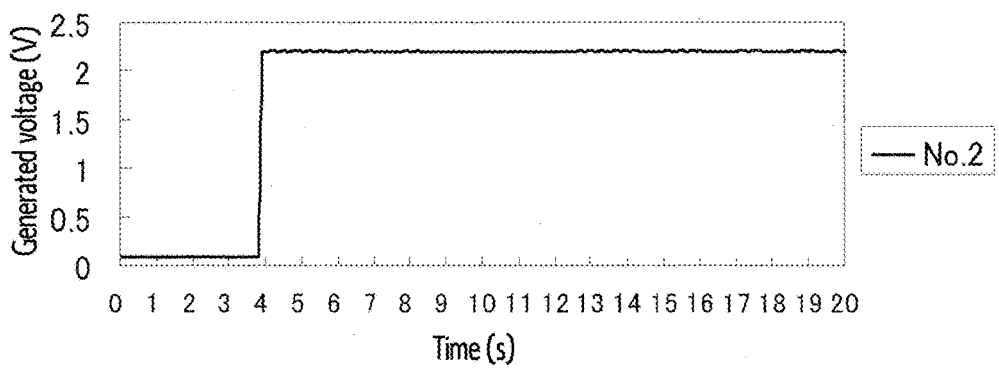
FIG. 21(b) is a graph showing change in light-emitting voltage of the light-receiving element of a pair referred to as "No. 2" in FIG. 20.
Figure 21C:
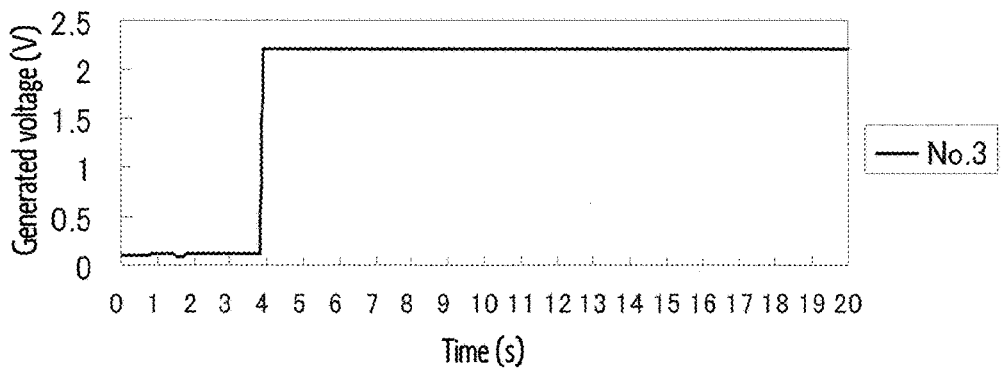
FIG. 21(c) is a graph showing change in light-emitting voltage of the light-receiving element of a pair referred to as "No. 3" in FIG. 20.

As shown in FIG. 21, the voltages generated by the illuminance sensors in Nos. 1 to 3 were almost 0 V in the region of 0 seconds to 4 seconds wherein the power supply was in the OFF state. Next, the gas was supplied from the outside and the power supply of the light emitting diode was switched ON in the region of 4 seconds to 9 seconds, it was confirmed that only the voltage generated by the illuminance sensor in No. 1 wherein the bubble was positioned in the optical path was varied according to the generation of bubble which is positioned in the optical path. Specifically, it was confirmed that the generated voltage varied between 0.5 V and 2.2V in accordance with the presence or absence of the bubble. The generated voltages by the illuminance sensors in Nos. 2 and 3 wherein the bubble was not positioned in the optical path, were constantly 2.2 V regardless of the presence or absence of the bubble.

Next, in the region of 9 seconds to 12.5 seconds, the gas supply was stopped while the power supply of the light-emitting diode was in the ON state. In that region, the generated voltage of the illuminance sensor in No. 1 was almost constantly 2.2 V similarly to those of the illuminance sensors in Nos. 2 and 3. Finally, the gas was again supplied in the region of 12.5 seconds to 20 seconds. In that region, only the generated voltage of the illuminance sensor in No. 1 was varied again in accordance with the generation of bubble. Therefore, it was possible to confirm that the light-emitting element and the light-receiving element was able to be used as the gas detection device by this example. In this example, the determination was conducted with a 100 ms interval because of the performance of the data logger. The detection sensitivity can be further improved by shortening the determination interval of the data logger.

In the above example, the semiconductor laser can be used instead of the light-emitting diode. Furthermore, it is not necessarily needed to pair the light-emitting element and the light-receiving element. For example, the light-emitting element may be an illumination apparatus which illuminates the treatment vessel entirely. Alternatively, the light emitting elements and the light receiving elements can be arranged in a matrix. In that case, the presence or absence of the bubble can be detected two-dimensionally. For example, the size of the bubble (or the degree of spread of bubble) can be also detected at the same time.

Alternatively, the detection device using an acoustic wave such as ultrasonic waves can be used as the bubble detection device. Similarly to the case of the light-emitting and light-receiving elements, the detection device is set such that the acoustic wave passes through the bubble-formed part. As in the case of light, since the travelling path of the acoustic wave is changed depending on the presence or absence of bubble, the presence or absence of bubble can be detected by detecting the change. Further, the wavelength shift of the acoustic wave due to the Doppler effect can be detected based on the flow rate of the bubble.

Figure 18A:
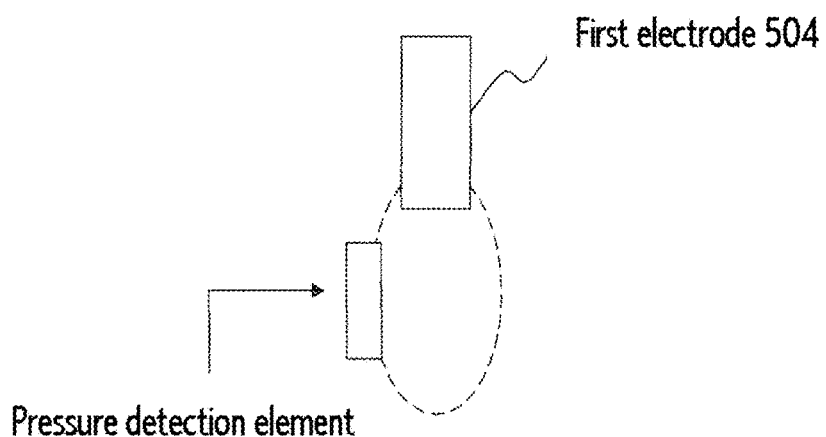
FIG. 18(a) is a schematic view showing an example of a bubble detection method when a pressure-sensing device is used as a bubble detection device and FIG. 18(b) is algorithm for determining presence or absence of bubble formation when using the pressure sensing device is used as the bubble detection method.
Figure 18B:
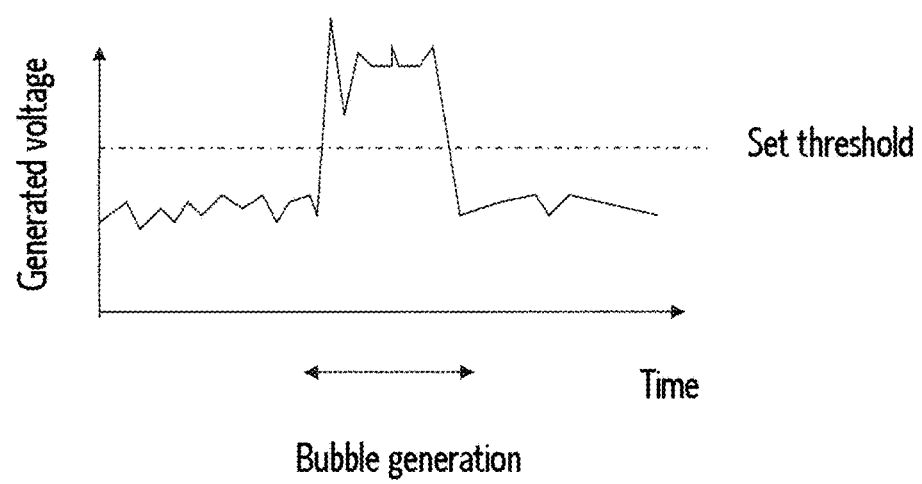

Alternatively, a pressure detection device can be used as the bubble detection device. FIG. 18(a) schematically shows a method for detecting bubble by means of a bubble detection device wherein a pressure detection element is used. For example, a piezoelectric element as a pressure detection element is provided at a region where the bubble is formed, in the vicinity of the electrode. A known piezoelectric element may be used. For example, an element wherein a PZT thin film or a PVDF thin film is used may be used. When the piezoelectric element contacts with the bubble upon the formation of the bubble in the vicinity of the electrode, the pressure thereof generates voltage. The pressure generated in the liquid is previously detected as background, and the presence or absence of bubble is detected based on pressure difference caused by the bubble generation. The presence or absence of bubble can be judged by reading the difference with use of a predetermined algorithm. An example is shown in FIG. 18(b). The size of the bubble can be detected by selecting the position where the piezoelectric element is arranged and setting a threshold of the readout voltage. The piezoelectric element as the bubble detection device may not be placed in the vicinity of the electrode, and may be incorporated into the electrode. The bubble detection device using the piezoelectric element can be configured without requiring an external power supply for driving. Therefore, such configuration is effective for reduction in power consumption of the entire apparatus.

Figure 19A:
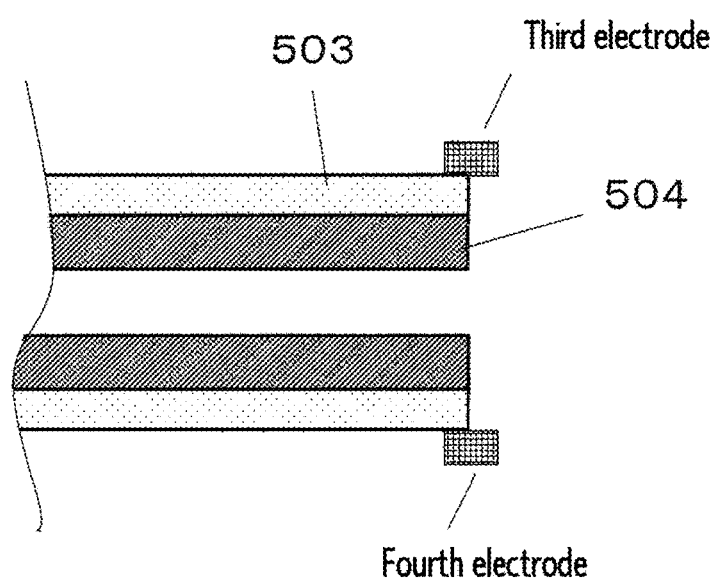
FIG. 19(a) is a sectional side view of a resistance detection device as the bubble detection device when the bubble is not generated and FIG. 19(b) is a sectional side view of the resistance detection device as the bubble detection device when the bubble is generated.
Figure 19B:
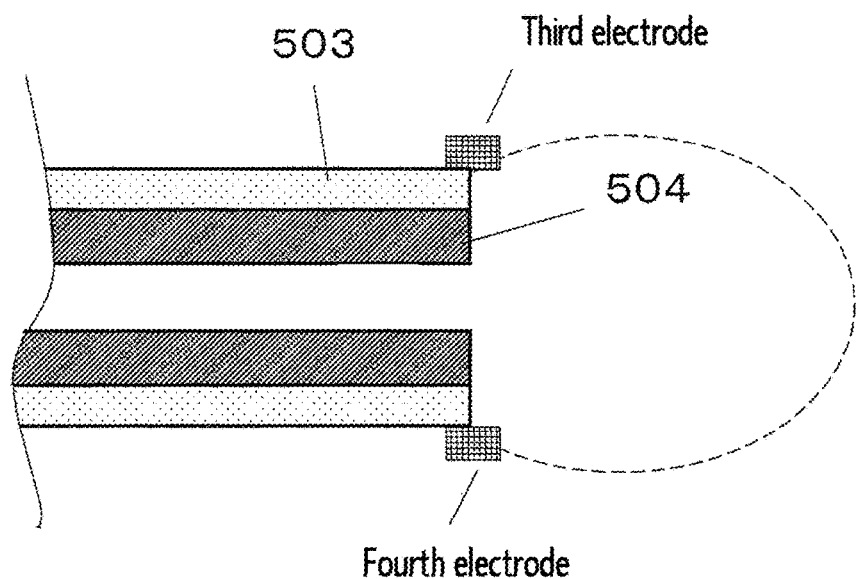

Alternatively, a resistance detection device may be used as the bubble detection device. FIG. 19 schematically shows a method for detecting bubble by means of a bubble detection device wherein a resistance detection device is used. For example, a third electrode and a fourth electrode are provided around and insulated from the first electrode 504. Specifically, the third and the fourth electrodes are installed around the insulator 504 as shown in FIG. 19. When the bubble is formed and surrounds the third and the fourth electrodes (FIG. 19(b)), an inter-electrode region is occupied only by the gas. This causes significant change in resistance between the electrodes. The presence or absence of bubble can be detected by reading out this resistance. Alternatively, the resistance detection device may be of configuration having another electrode around the first electrode such that a resistance value between the first electrode and the another electrode is read out. The presence or absence of bubble can be also detected based on the change of resistance between the first electrode and another electrode.

Alternatively, a capacitance detection device can be used as the bubble detection device. A third electrode and a fourth electrode arranged around the electrode are used similarly to the case of using the resistance detection device. When the bubble is formed, the inter-electrode region is occupied only by the gas. This causes significant change in dielectric constant between the electrodes, involving the significant change in capacitance between the electrodes. The presence or absence of bubble can be detected by detecting this change of capacitance. Alternatively, the capacitance detection device may be of configuration having another electrode around the first electrode such that a dielectric constant (capacitance) between the first electrode and the another electrode is read out. The presence or absence of bubble can be detected based on the change of capacitance between the first electrode and the another electrode.

Alternatively, the bubble detection device may be integrated with the pump. For example, the presence or absence of bubble can be detected by reading out a load current of the pump for bulb introduction. A load is generated in the pump when the bubble is formed by driving the pump. This load varies depending on the presence or absence of bubble around the electrode. For this reason, the presence or absence of bubble can be detected by detecting this difference in load with use of a predetermined algorithm. This method is effective when the capacity of the pump is small. Since the pump capacity is reduced, the variation of the load caused by the presence or absence of bubble formation is large, facilitating the bubble detection.

[Operation]

Next, the operation of the liquid-treating apparatus of the present embodiment will be described. Air of 20 ml/min is supplied from the pump 505. The electrode coverage represented by time ratio is about 30% according to FIG. 12.

In the present embodiment, the bubble detection is conducted by using a high-speed camera. Of course, other bubble detection devices as described above can be used. The control of the power supply is conducted by means of the control apparatus in accordance with the presence or absence of bubble generation detected by the high-speed camera. Therefore, all of the applied voltage can be used in plasma discharge.

[Effect]

The plasma discharge can be performed efficiently with reduced loss of power consumption, by observing the state of the bubble with use of the bubble detection device and giving feedback to the power supply with use of the control apparatus. In the present embodiment, a configuration which includes the control apparatus and the bubble detection device in addition to the liquid-treating apparatus of the first embodiment has been described. The control apparatus and the bubble detection device are applicable in the second and the third embodiments.

Sixth Embodiment

[Overall Configuration]

Figure 22:
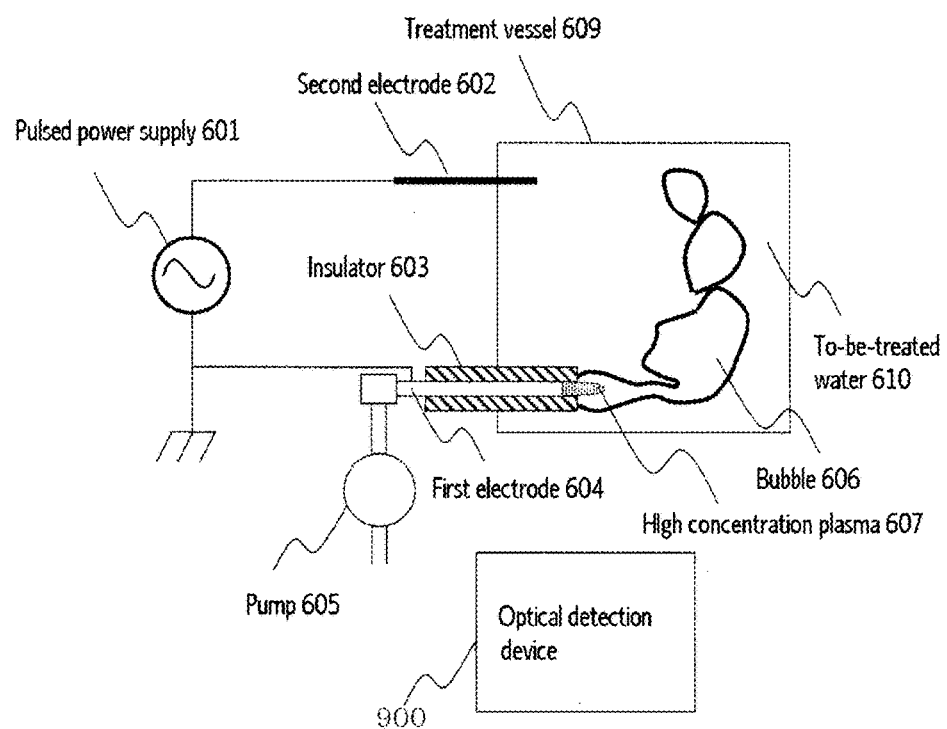
FIG. 22 is a configuration view of a liquid-treating apparatus in a sixth embodiment.

FIG. 22 is a configuration view of a liquid-treating apparatus in the present embodiment. In the present embodiment, the optical detection device 900 for determining the types of components contained in the liquid is provided. The other configuration is the same as that of the fourth embodiment (but the control apparatus is not used). In FIG. 22, a numeral having the same last two digits as those of the numeral in FIG. 1 denotes the same element or member denoted by the numeral in FIG. 1.

The optical detection device 900 detects, from lights generated by the plasma, a wavelength and intensity of a light emitted from a component contained in the plasma and thereby determines the type and the amount of component contained in the plasma, that is, component contained in the liquid. In other words, the component is quantitatively and qualitatively analyzed. A combination of a CCD and a spectrometer is used as the optical detection device 900. The component which it to be analyzed is one emitting a light having a peculiar wavelength in the plasma. Therefore, both of an organic substance and an inorganic substance may can be an object for analysis. For example, components that can be analyzed are calcium, sodium and potassium.

In the present embodiment, a transparent plastic container is used as a treatment vessel 609. The entire of the treating vessel 609 is not necessarily required to be transparent and a part of treating vessel 609 may be transparent such that a part thereof can pass the light emitted from the plasma therethrough the part and the optical detection device 900 can detect the emission spectrum of the light.

[Operation]

A commercial spectroscopic system was used as the optical detection device 900 and lights of wavelengths of 300 nm to 800 nm are determined. An exposure time was 20 ms. An optical fiber which is attached to the spectrometer was set outside the treatment vessel 609 around the position where the plasma is formed. The following three tests were carried out in order to determine the emission spectrum.

(Test 1)

Figure 23:
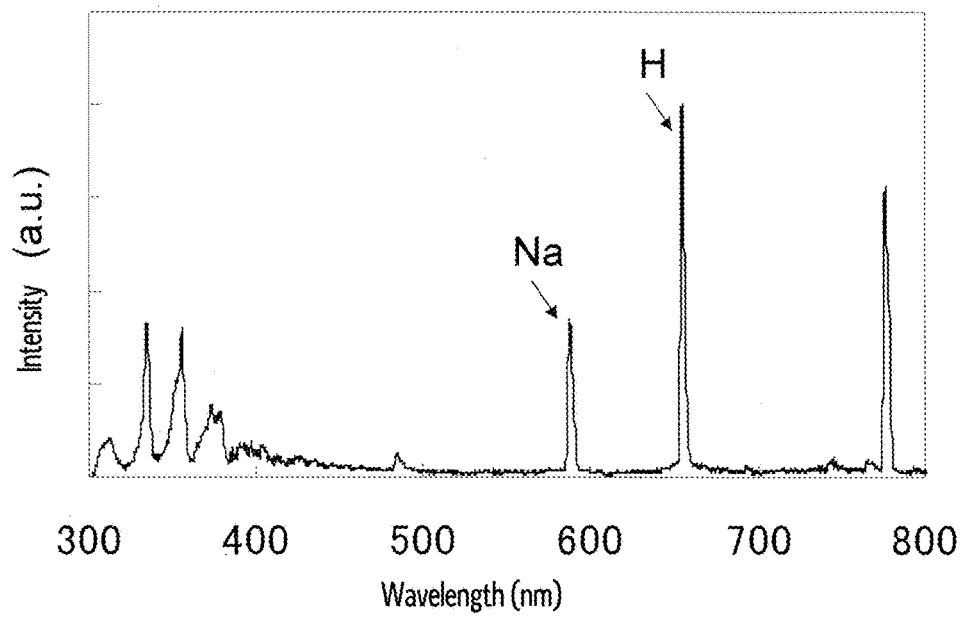
FIG. 23 is a graph showing an emission spectrum of plasma light.

NaCl was dissolved in pure water to give a to-be-treated water 610 of which conductivity was 300 mS/m. The plasma was generated in the to-be-treated water 610 and the emission spectrum of the plasma was measured. A bubble 606 was generated by introducing air at a flow rate of 2000 ml/min from the outside. Discharge was conducted by supplying, from a power supply 601, a power of 200 W, and applying pulsed voltage having a peak voltage of 4 kV, a pulse duration of 1 μs and a frequency of 30 kHz. The measurement results are shown in FIG. 23. In the emission spectrum, a peak peculiar to Na appeared in the vicinity of 589 nm and thereby Na was detected. It was found that, from this test, Na which is an impurity in pure water was able to be detected by the present embodiment.

(Test 2)

Figure 24:
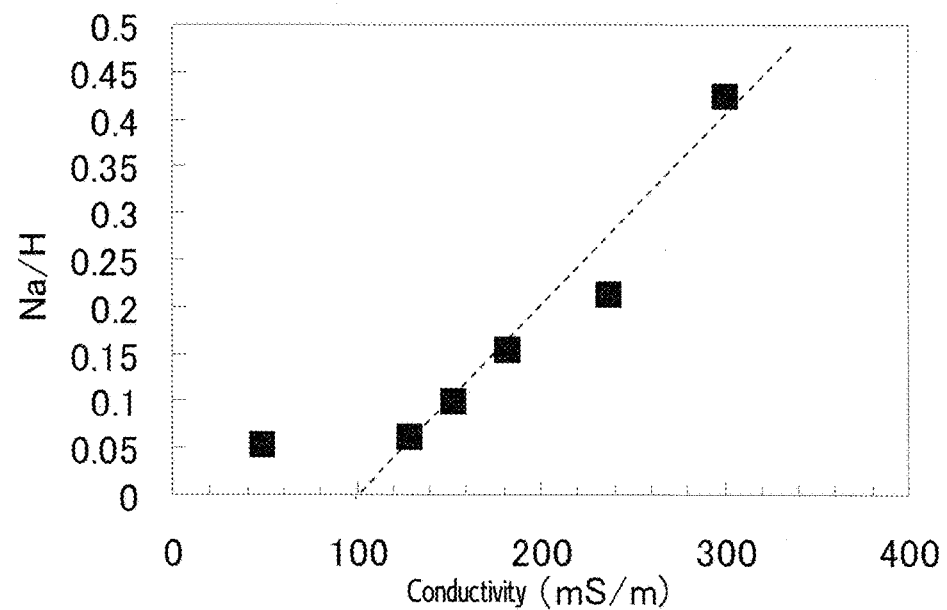
FIG. 24 is a graph showing change in ratio of a Na spectrum to a H spectrum in the emission spectrum of the plasma light when conductivity of the liquid is changed.

NaCl was dissolved in pure water similarly to Test 1. Unlike Test 1, the mission spectrum was measured while the conductivity of the solution was varied in a range of 48.5 mS/m to 300 mS/m. The spectrum of Na around 589 nm was normalized by the spectrum of H around 655 nm, and the conductivity of the aqueous solution was plotted in a longitudinal axis and the ratio of Na to H was plotted in a horizontal axis. The results are shown in FIG. 24. From FIG. 24, it was found that the Na/H ratio maintained its linearity for an aqueous NaCl solution of 100 mS/m or more and the analysis of the amount of Na was possible.

(Test 3)

Figure 25:
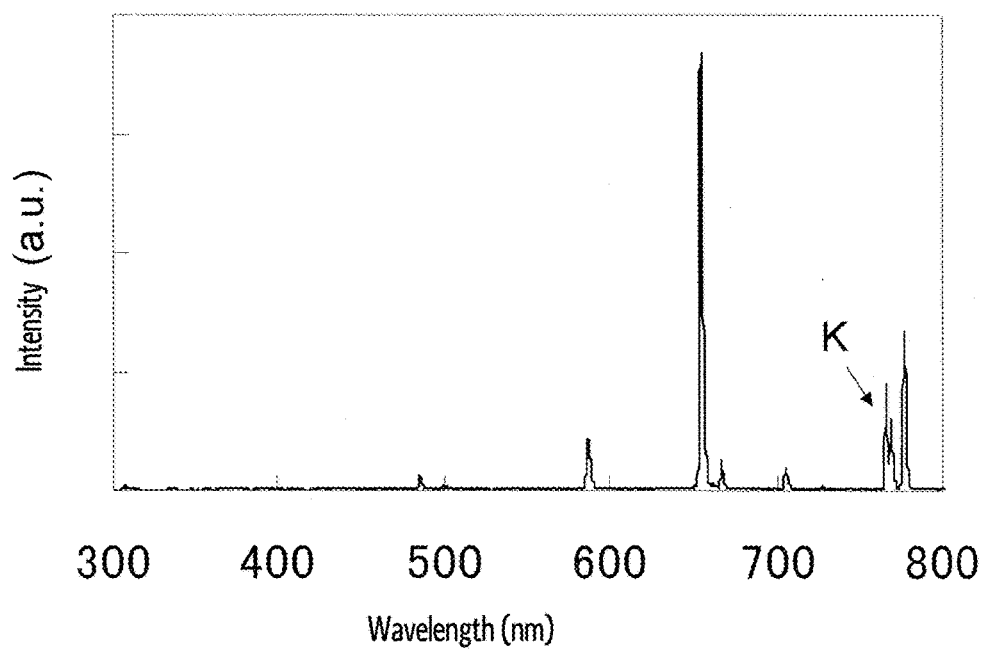
FIG. 25 is a graph showing an emission spectrum of plasma light.

The plasma was generated in an aqueous solution wherein "Fine powder HYPONeX" (trade name) of HYPONeX JAPAN CORP., LTD. was dissolved in pure water and emission spectrum was measured. "Fine powder HYPONeX" is used by being dissolved in water for hydroponic culture and the aqueous solution of "Fine powder HYPONeX" contains K (potassium) as a component. The aqueous solution was prepared by dissolving 0.9 g "Fine powder HYPONeX" in 450 cc pure water. The conductivity of the aqueous solution was about 200 mS/m. The bubble 606 was generated by introducing He at a flow rate of 300 ml/min from the outside. The discharge was conducted by supplying power of 30 W from the power supply 601 and by applying pulsed voltage having a peak voltage of 10 kV, a pulse duration of 33 μs and a frequency of 30 kHz to the first electrode 604. The results are shown in FIG. 25. As shown in FIG. 25, the spectrum peculiar to K was able to be observed around 766 nm. It was found that, from this test, Ka which is an impurity in pure water was able to be detected by the present embodiment.

Figure 26:
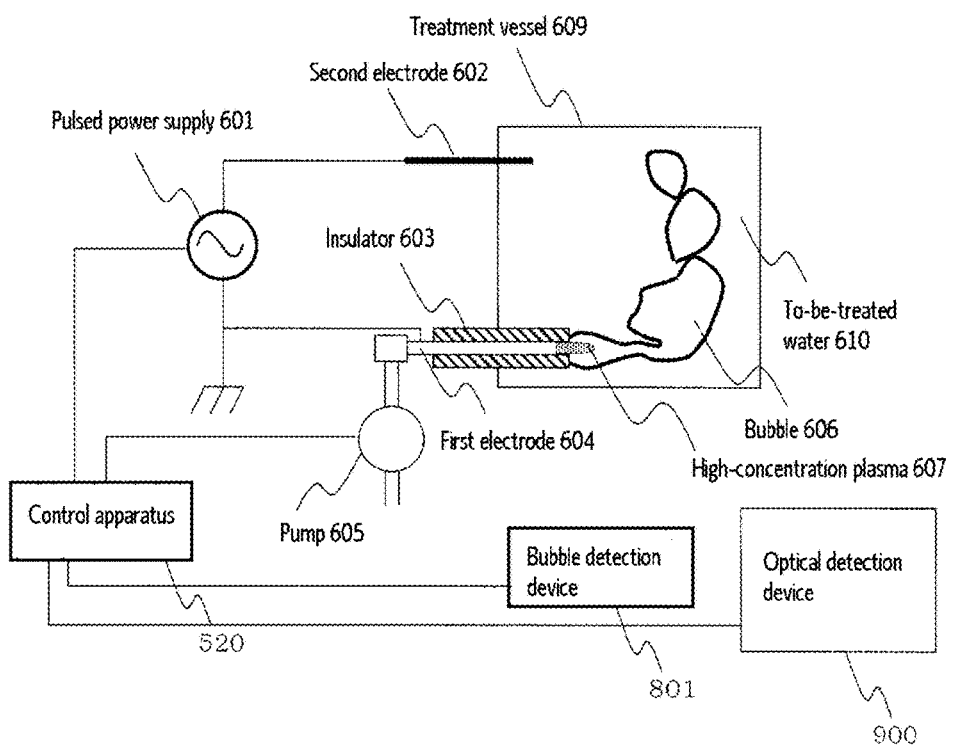
FIG. 26 is a configuration view of a liquid-treating apparatus of a variation of the sixth embodiment.

A variation of the present embodiment is shown in FIG. 26. FIG. 26 shows an example of a combination of the optical detection device 900 and the control apparatus 520 and the bubble detection device 801 as described in the fifth embodiment. The plasma is generated in the bubble 606 in the plasma-generating apparatus of the present embodiment when the voltage is applied in the state where the bubble 606 is generated at the first electrode 604. Therefore, when the bubble 606 is not formed, the plasma is not generated and consequently the emission from the plasma is not obtained. Therefore, the exposure time of the optical detection device 900 is required to be long in order to obtain the emission spectrum without missing the timing of plasma generation. However, if the exposure time is long, the detection amount of the optical detection device 900 may be saturated and therefore the exposure time of the optical detection device 900 often needs to be limited to some extent. Specifically, for example, a processing is carried out wherein signals of milliseconds are integrated and an average value of a plurality of signals is determined.

When, for example, a general CCD is used as the optical detection device 900, the light detection is not synchronized with the timing of discharge which is accidental from the viewpoint of microscopic time scale. For this reason, when the bubble is not formed in the vicinity of the electrode 604 within a millisecond while the exposure is conducted, the amount of light detection becomes almost zero, resulting in reduction in detection sensitivity. Therefore, in this variation, the exposure of the optical detection device 900 is controlled by the control apparatus 520 when a bubble detection device 801 detects the bubble. Since this configuration can suppress the exposure during the time when the plasma light is not generated, the overall measurement sensitivity (or analysis sensitivity) of the apparatus can be improved.

The analysis using the emission spectrum of the plasma light may be used for, for example, quantitative analysis of calcium, sodium and potassium. Other various elements can be detected in principle and therefore the present embodiment can be used as wide variety of liquid analysis apparatuses (for example, a water quality analysis apparatus). Further, the liquid analysis apparatus of the present embodiment may be one which carries out the liquid analysis and the liquid treatment at the same time. For example, in the case of using the apparatus of the present embodiment in a washing machine, the hardness is determined by measurement of a calcium concentration in water and an amount of detergent can be adjusted depending on the hardness. In that case, the water may be treated simultaneously with the hardness determination. Alternatively, the liquid analysis apparatus may be used for management of a solution for plant cultivation. Specifically, it may be used for analyzing the amount of sodium and the amount of potassium in the solution for plant cultivation. In this case, the sterilization of the plant cultivation solution may be conducted by the plasma generation simultaneously with the analysis.

Embodiment 7

[Study of the Angle of the Bubble-Generating Part]

In the present embodiment, the effect of the direction of the opening portion of the bubble-generating part on the electrode coverage and the bubble size in the liquid-treating apparatus employed in the fourth embodiment, will be explained. In the present embodiment, the liquid-treating apparatus having the same configuration as that of the apparatus employed in the first embodiment was used. In this embodiment, a cylindrical metal electrode having an inner diameter of 1 mm and an outer diameter of 2 mm was used as the first electrode 104. Alumina ceramics having an inner diameter of 2 mm and an outer diameter of 3 mm was placed on the outer peripheral surface of the first electrode 104 such that a gap was not formed therebetween.

Figure 27:
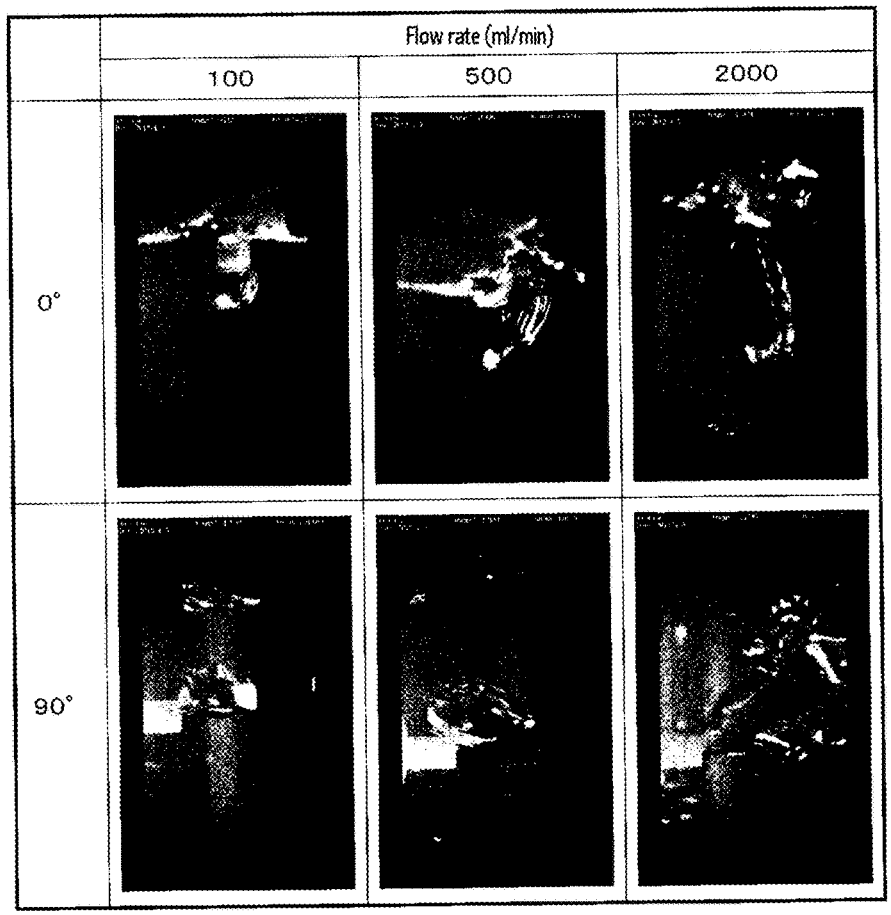
FIG. 27 is a graph showing bubbles in a seventh embodiment.

Further, in this embodiment, the first electrode 104 was installed by changing an installation angle in 30-degree increments in a range of 0 degree to 180 degrees and the bubble was generated at the respective installation angle. The angle of the first electrode 104 shall be 0 degree when the direction toward which the opening portion is faced (more specifically, the direction of the gas passing through the first electrode 104) matches the direction in which gravity is given; and the angle shall be 180 degree when the direction matches the direction opposite to the direction in which the gravity is provided. Therefore, the angle of the first electrode 104 shown in FIG. 1 is 90 degree. The appearance of the bubble at the tip portion of the electrode was observed when changing the angle of the first electrode 104. The flow rate of the gas was changed to 100 ml/min, 500 ml/min, or 2000 ml/min every time the angle of the first electrode 104 was changed, and the appearance of the bubble at each flow rate was observed. FIG. 27 shows high-speed camera photographs of the bubbles when the angles of the first electrode 104 were 0 degree and 90 degrees.

Figure 28A:
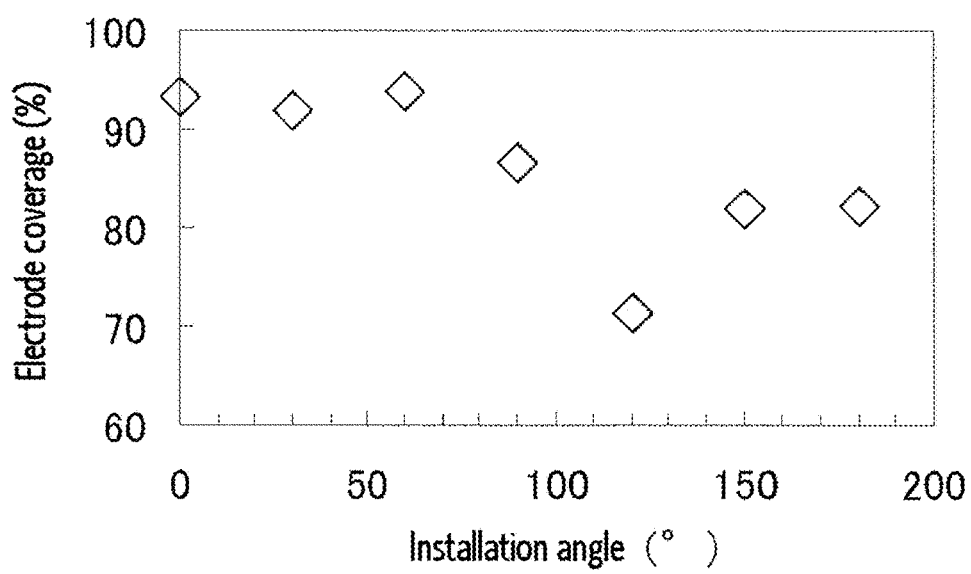
FIG. 28(a) is a graph showing relationship between a direction of an opening portion of the first electrode and an electrode coverage (at a flow rate of 100 ml/min) and FIG. 28(b) is a graph showing relationship between the direction of the opening portion of the first electrode and the electrode coverage (at a flow rate of 500 ml/min) and FIG. 28(c) is a graph showing relationship between a direction of the opening portion of the first electrode and the electrode coverage (at a flow rate of 2000 ml/min).
Figure 28B:
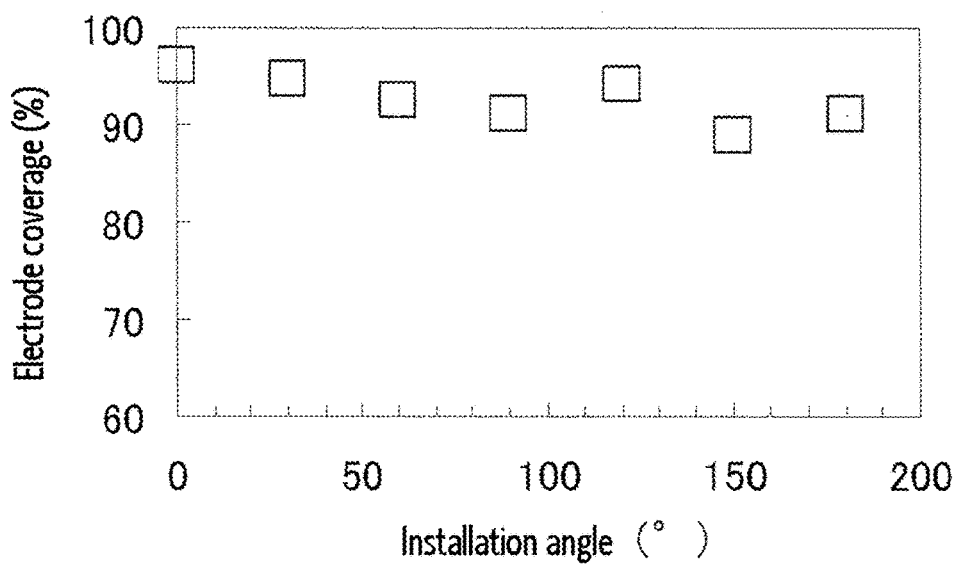
Figure 28C:
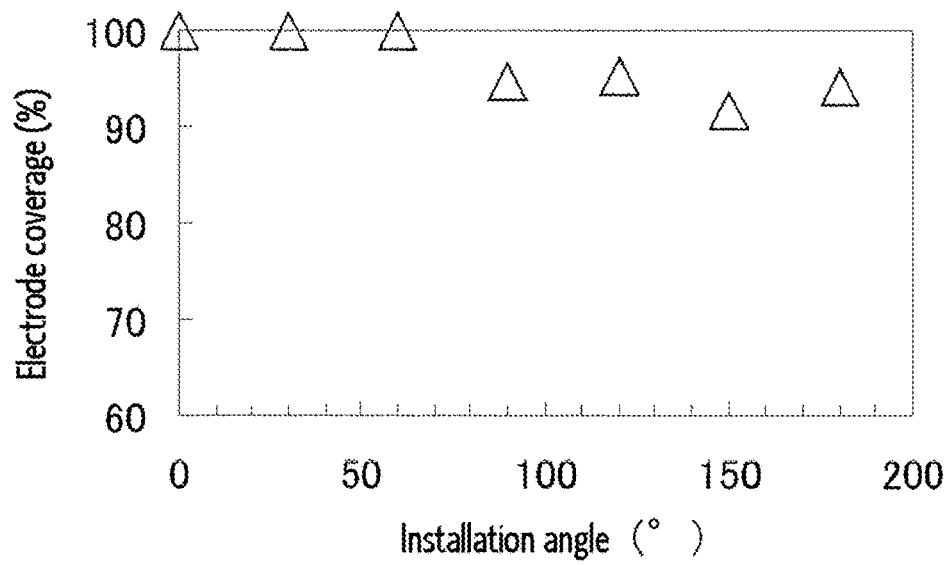

FIGS. 28(*a*) to 28(*c*) are the graphs wherein the electrode coverage was plotted against the angle of the first electrode. FIGS. 28(*a*), 28(*b*) and 28(*c*) are the graphs when the flow rates of gas are 100 ml/min, 500 ml/min and 2000 ml/min, respectively. The electrode coverage was determined according to the method as described above. As shown in FIG. 28, it was found that almost the constant electrode coverage was obtained for the respective flow rates when the installation angle was in a range of 0 degree to 60 degree, but the electrode coverage was reduced when the installation angle was in a range of 60 degree to 180 degree. It was found that the degree of reduction was particularly remarkable when the flow rate is small. From these results, it was found the installation angle of 0 degree to 60 degrees enabled the electrode to be covered with the bubble stably and thereby the plasma was able to be generated stably.

Figure 29:
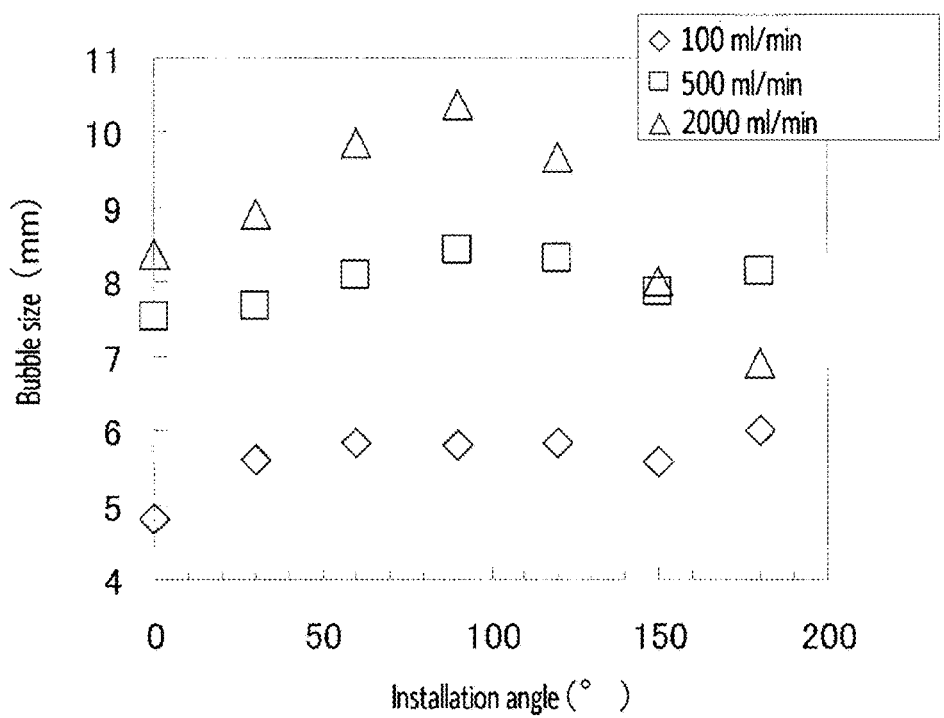
FIG. 29 is a graph showing relationship between the direction of the opening portion of the first electrode and a bubble size.
Figure 30:
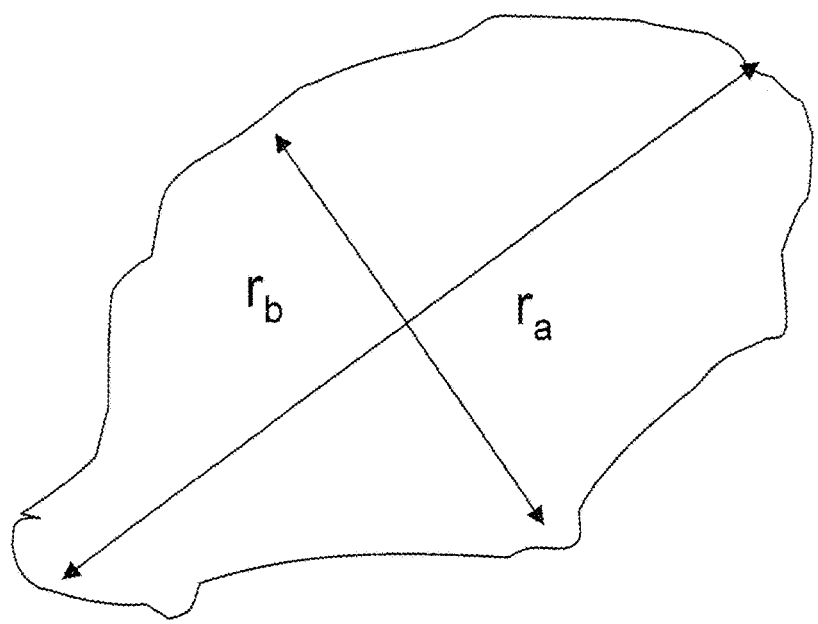
FIG. 30 is a schematic view showing ra and rb for determining the bubble size.

FIG. 29 is a graph wherein the size of bubble is plotted against the angle of the first electrode. In FIG. 29, the angle of the electrode is shown in the horizontal axis and the bubble size is shown in the vertical axis. The dimensions "ra" and "rb" which pass through the center of the bubble are determined from the high-speed camera photographs and (ra×rb)$^{1/2}$ is calculated as the bubble size. As shown in FIG. 30, "ra" is a distance of the longest line segment which is one of line segments connecting two arbitrary points on the contour of the bubble and passes through the center of the bubble, and "rb" is the longest line segment which is one of the line segments perpendicular to "ra" and passes through the center of the bubble. The bubble size plotted in FIG. 29 is an average value of the values determined from three photographs which were taken just before the bubble was away from the first electrode. The three photographs were selected from the photographs which were taken with the angle of the first electrode and the flow rate of the gas fixed.

As shown in FIG. 29, it was found that, in both cases of a large flow rate and a small flow rate, the bubble size was maximal when the angle of the first electrode was about 90 degrees, for example, 80 degrees to 100 degrees. It is considered that, in the present embodiment, the bubble dimension is less likely to be large in case of a small angle since the bubble escapes upwardly due to buoyancy, and the bubble is less likely to be large in case of a large angle since the bubble is away from the electrode due to buoyancy. For this reason, it is considered that the bubble size can be maximized when the angle of the first electrode is about 90 degrees (for example, 80 degrees to 100 degrees). When the bubble size is large, the size of plasma formed within the bubble is also large. It should be noted that, in the case where the flow rate of gas is 100 ml/minute, the bubble size when the angle of the first electrode is 180 degrees is larger than that when the angle of the first electrode is 90 degrees. It is considered that this is because the bubble is spread relatively well due to the fact that the flow rate is small relative to the surface tension at the point where the gas contacts with the gas.

Embodiment 8

[Study on Bubble Size and the Depth of Water]

In the present embodiment, the depth of the position where the first electrode is provided and the bubble size are discussed in the case where the bubble-generating part is the opening portion of the cylindrical first electrode from which the bubble is generated. As described in the seventh embodiment, as the bubble size is larger, the larger plasma is formed. In particular, the bubble size is influenced by the distance between the liquid surface and the position where the first electrode is provided, that is, the depth of the first electrode. This point is discussed.

The diameter of the bubble is represented by the following formula assuming that the shape of bubble is sphere and the Young-Laplace formula holds.

$$P_i - P_0 = \frac{4\gamma}{D}$$

In the formula, $P_i$ is an internal pressure within the bubble, $P_0$ is an external pressure, $\gamma$ is an interfacial tension and D is a diameter of the bubble.

Further, since the external pressure $P_0$ in the above formula is the sum of an atmospheric pressure $P_{at}$ and a hydrostatic pressure and the hydrostatic pressure is a product of a density of liquid "ρ", a depth of water "h" and a gravity acceleration "g", the following formula holds:

$$P_O = P_{at} + \rho g h$$

The diameter of the bubble at the depth of water "h" is calculated using these two formulas.

Figure 37:
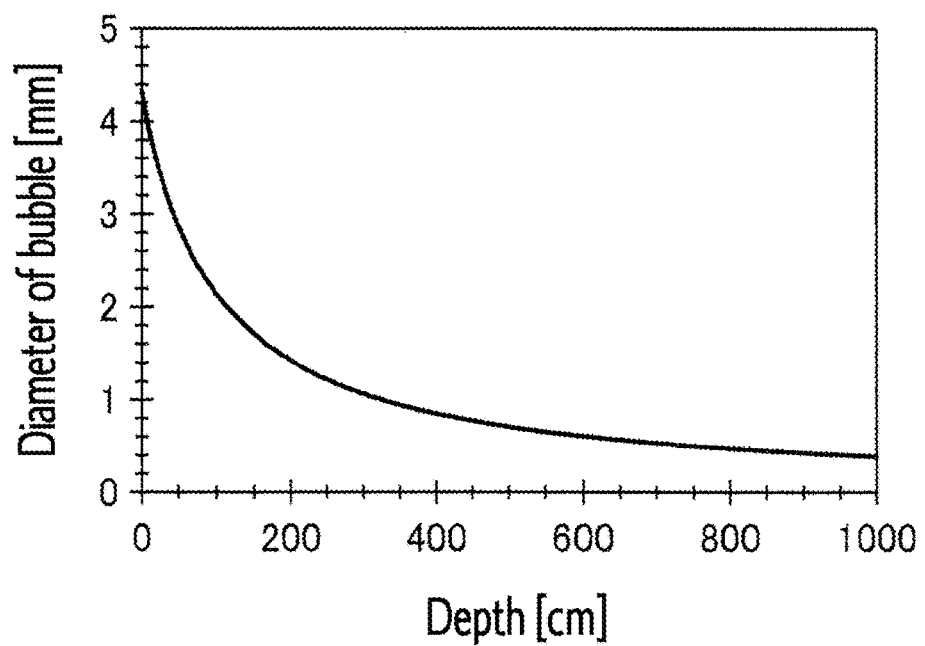
FIG. 37 is a graph showing relationship between position of the first electrode in a depth direction of the liquid and a diameter of the bubble.

Since "ρ" is about 1 g/cm$^3$ in the case of water, the relationship between the depth of water and the diameter of bubble is as shown in FIG. 37. Here, it was determined experimentally that the diameter of bubble was 4 mm at the depth water of 8 cm. The limit of the position where the first electrode is provided (more exactly, the position of the bubble-generating part) is about 40 cm, on the condition that the surface where the conductor is exposed, of the first electrode is not covered with the bubble unless the bubble has a diameter of 3 mm. When the first electrode is provided at a position deeper than this position, it is necessary to increase the internal pressure within the bubble so as to cover the surface where the conductor is exposed, of the first electrode with the bubble.

Therefore, the surface where the conductor is exposed, of the first electrode can be surely covered by providing an apparatus which detects the bubble size and adjusts the internal pressure based on the detected size such that a predetermined diameter can be obtained. Alternatively, the internal pressure may be changed depending on the depth such that a predetermined internal pressure is obtained according to the depth since the relationship between the depth of water and the necessary internal pressure can be determined in advance.

The adjustment of the internal pressure may be performed by supplying the gas through a decompression device from a booster pump or a high-pressure gas cylinder. The adjustment of the internal pressure may be conducted in connection with the device for detecting bubble size, for example, an apparatus which is capable of processing for determining the bubble diameter from the high-speed camera photographs of the bubble, or a plurality of photodetectors for determining the bubble so as to give an optimal internal pressure depending on a value of bubble diameter which is transmitted from an apparatus for detecting the bubble size.

In the case of detecting the bubble size, the position (depth) where the bubble is generated may be changed depending on the bubble size in lieu of or in addition to the adjustment of the internal pressure of the bubble. That is, if the bubble size detected is small, the bubble may be generated at a shallower position such that a lager bubble is obtained. The position where the bubble is generated may be changed by, for example, providing a plurality of bubble-generating parts at different depths and controlling the power supply apparatus and/or the bubble-generating parts such that the bubble is generated only from the bubble-generating part at a suitable position depending on the results of bubble size detection. Alternatively, the position where the bubble is generated may be changed by controlling a power-generating parts provided with a plurality of power generation openings at different positions. Specifically, the positional change may be conducted by selecting the bubble generation opening at an appropriate position depending on the detection results of the bubble size and controlling the bubble-generating part such that the bubble is generated only from the selected bubble-generation opening. The selection of the bubble generation opening may be conducted such that the bubble generation opening is opened or closed by a shutter.

The liquid-treating apparatus and the liquid analysis apparatus have been described as the embodiments, but the present invention shall not be limited to the embodiments described above. In the above embodiments, the embodiment wherein the to-be-treated liquid is water has been described as an example and the embodiment wherein the aqueous indigocarmin solution is used as a model has been described. The same effects can be obtained even if the liquid is alcohol, sea water, or an aqueous solution wherein a chemical is dissolved.

Two or more embodiments described above may be combined, or partial configurations of the embodiments may be combined. Further, the configuration described as the liquid-treating apparatus in the embodiment may be applied to the liquid analysis apparatus, or the configuration described as the liquid analysis apparatus may be applied to the liquid-treating apparatus.

In the above embodiment, a technique of generating the bubble has been described wherein the first electrode is made tubular (more specifically, cylindrical) and the gas is supplied from the gas supplying apparatus to the first electrode so as to supply the gas through the opening portion of the first electrode into the liquid. In another embodiment, the bubble-generating part may be provided independently from the first electrode. The bubble-generating part generates a bubble such that the surface where the conductor is exposed, of the surface of the first which surface is positioned in the liquid, is covered by the gas within the bubble, that is, the surface where the conductor is exposed is positioned within the bubble. Such a bubble is formed by appropriately selecting a flow rate of the gas send to the bubble-generating part, a size of the bubble-generating part (for example, an inner diameter of the bubble-generating part if the bubble-generating part is cylindrical) and the position of the bubble-generating part. When the gas-generating part is placed under the first electrode, the gas in the bubble easily covers the surface of the first electrode since the bubble formed in the liquid moves from bottom to top by buoyancy. It is needless to say that the angle of the bubble-generating part may be selected and the position of the bubble-generating part in a liquid-depth direction may be selected as described in the seventh and eighth embodiments when the gas-generating part is provided independently from the first electrode.

In the embodiments described above, the first electrode is made tubular and the outer peripheral surface of the first electrode is covered with insulator such that the outer peripheral surface of the first electrode is not exposed to the liquid. Therefore, the area to be covered by the gas in the bubble is only the vicinity of the opening portion (end face) of the first electrode. Therefore, the effect given by the generation of plasma within the bubble can be obtained relatively with ease by using the first electrode of such configuration. In another embodiment, the first electrode may not be covered with the insulator. In this case, the gas-generating part is provided such that the entire of the surface portion of the first electrode which portion is positioned within the liquid is covered with the gas. Alternatively, in another embodiment, the insulator may cover a part of the outer peripheral surface of the first electrode. In this case, the surface portion of the first electrode, which portion is not covered with the insulator, is required to be covered with the gas within the bubble.

In the above embodiments, a circulation pump for circulating the to-be-treated water is provided. The circulation pump is not necessarily needed. In the plasma-generating apparatus according to the present embodiment, the generation of bubble causes the circulation of the liquid naturally in the treatment vessel and the circulation of the liquid is also facilitated by the generation of microbubbles. Thus, the entire to-be-treated water can be treated by plasma even if the circulation pump is not provided.

In the embodiments described above and other embodiments, a film for preventing the electrode from corroding may be formed on the first electrode. The corrosion protection film is formed by selecting material and thickness in consideration of the material for electrode and the voltage applied to the electrode, such that the discharge between the first electrode and the second electrode is not hindered. The effect of the present invention can be obtained even if such a film is formed on the conductor surface of the first electrode and the embodiment having such a film is covered by the claims of the present application.

The plasma-generating apparatuses of the above embodiments and other embodiments are suitable for: liquid treatment by decomposition of the chemical presenting in the liquid, the destruction of microorganism or sterilization; or the quantitative analysis of calcium, sodium and potassium in the liquid, or the like, and can be used together with various products, particularly electrical products, or can be used being incorporated into electrical products. The electrical products include water purification apparatuses, air conditioners, humidifiers, ballast water treatment systems for ships, washing machines for electric razors, washing machines and dishwashers. The water purification apparatuses, the air conditioners, the humidifiers, the washing machines for electric razors and dishwashers may be for home use. The plasma generating apparatuses of the above embodiments and other embodiments can be operated using a power supply for a household appliance since the apparatuses can treat the liquid with a low power.

The present invention includes the following modes.

First Mode

A plasma-generating apparatus including:

a first electrode of which at least a part is placed in a treatment vessel that is to contain liquid, a second electrode of which at least a part is placed in the treatment vessel, a bubble-generating part which generates a bubble in the liquid when the liquid is contained in the treatment vessel such that at least surface where conductor is exposed, of a surface of the first electrode which surface is positioned in the treatment vessel, is positioned within the bubble, a gas-supplying apparatus which supplies gas in an amount necessary for the bubble-generating part to generate the bubble from the outside of the treatment vessel to the bubble-generating part, a power supply which applies voltage between the first electrode and the second electrode, and a control apparatus which controls one or both of the gas-supplying apparatus and the power supply such that the voltage is applied between the first electrode and the second electrode when the at least surface where the conductor is exposed, of the first electrode is positioned within the bubble.

Second Mode

The plasma-generating apparatus according to the first mode which further includes a bubble detection device which detects that the at least surface where the conductor is exposed, of the first electrode is positioned within the bubble, wherein the control apparatus controls one or both of the gas-supplying apparatus and the power supply based on the detection results by the bubble detection device.

Third Mode

The plasma-generating apparatus according to the second mode, wherein the bubble detection device detects that the at least surface where the conductor is exposed, of the first electrode is positioned within the bubble, based on one or more of the following changes which are involved by the generation of the bubble:

change in images of vicinity of the surface where the conductor is exposed, of the first electrode, change in resistance between the first electrode and another electrode which is insulated electrically from the first electrode, change in capacitance between the first electrode and another electrode which is insulated electrically from the first electrode, change in resistance between a third electrode and a fourth electrode which are insulated electrically from the first electrode, change in capacitance between a third electrode and a fourth electrode which are insulated electrically from the first electrode, change in an optical path or a light quantity of light which passes through the liquid, change in an acoustic wave which passes through the liquid, and change in pressure in the liquid.

Fourth Mode

The plasma-generating apparatus according to any one of the first to third modes, wherein a maximum value of the output capacity of the power supply is more than 0 W and less than 1000 W.

Fifth Mode

The plasma-generating apparatus according to any one of the first to fourth modes wherein, the first electrode is of a hollow shape having an opening portion, insulator is positioned in contact with an outer peripheral surface of the first electrode, the bubble-generating part generates the bubble from the opening portion of the first electrode, the bubble-generating part generates the bubble such that surface where the insulator is not positioned and the conductor is exposed, of the surface of the first electrode which surface is positioned in the treatment vessel, is positioned within the bubble.

Sixth Mode

The plasma-generating apparatus according to the fifth mode wherein a direction in which the opening portion of the first electrode is opened is from 0° to 60° when 0° is defined as a direction in which gravity is given and 180° is defined as a direction opposite to the direction in which the gravity is given.

Seventh Mode

The plasma-generating apparatus according to the fifth mode wherein a direction in which the opening portion of the first electrode is opened is from 80° to 100° when 0° is defined as a direction in which gravity is given and 180° is defined as a direction opposite to the direction in which the gravity is given.

Eighth Mode

The plasma-generating apparatus according to any one of the fifth to seventh modes, wherein an inner diameter of the first electrode is from 0.3 mm to 2 mm and an outer diameter of the first electrode is from 1 mm to 3 mm.

Ninth Mode

The plasma-generating apparatus according to any one of the fifth to seventh modes, wherein an end face of the opening portion of the first electrode is positioned inwardly from an end face of the insulator.

Tenth Mode

The plasma-generating apparatus according to the ninth mode wherein an outer diameter of the first electrode is from 1 mm to 3 mm.

Eleventh Mode

The plasma-generating apparatus according to any one of the fifth to tenth modes wherein, the insulator is of a hollow shape having an opening portion, and the first electrode is movable relatively to the insulator.

Twelfth Mode

The plasma-generating apparatus according to the eleventh mode, wherein an end face of the opening portion of the first electrode is moved inwardly from an end face of the insulator after the power supply applies the voltage between the first electrode and the second electrode.

Thirteenth Mode

The plasma-generating apparatus according to any one of the first to twelfth modes which further includes an optical detection device which measures an emission spectrum of the plasma, wherein, a component(s) in the liquid to be contained in the treatment vessel is qualitatively or quantitatively analyzed from the emission spectrum measured by the optical detection device.

Fourteenth Mode

The plasma-generating apparatus according to any one of the first to thirteenth modes which further includes an apparatus which adjusts an internal pressure of the bubble generated from the bubble-generating part.

Fifteenth Mode

The plasma-generating apparatus according to the fourteenth mode, which further includes a device which determines size of the bubble, wherein, the apparatus which adjusts an internal pressure of the bubble, adjusts the internal pressure of the bubble based on the size of the bubble which is determined by the device which determines size of the bubble.

Sixteenth Mode

The plasma-generating apparatus according to any one of the first to fifteenth modes which further includes a device which changes position where the bubble is generated from the bubble-generating part in a depth direction of the liquid.

Seventeenth Mode

The plasma-generating apparatus according to the sixteenth mode which further includes a device which determines size of the bubble, wherein, the device which changes position where the bubble is generated from the bubble-generating part changes the position where the bubble is generated, based on the size of the bubble which is determined by the device which determines size of the bubble.

Eighteenth Mode

The plasma-generating apparatus according to any one of the first to seventeenth modes, wherein the power supply applies a pulsed voltage.

Nineteenth Mode

The plasma-generating apparatus according to any one of the first to seventeenth modes, wherein the power supply applies an alternating voltage.

Twentieth Mode

The plasma-generating apparatus according to the eighteenth or nineteenth mode, wherein a voltage and a frequency of the power supply and a distance between the first electrode and the second electrode are set such that a resistance (R) of the liquid to be contained in the treatment vessel is lower than a resistance (R2) formed by connection of the first electrode and the liquid when the at least surface where the conductor is exposed, of the surface of the first electrode which surface is positioned in the treatment vessel, is positioned within the bubble.

Twenty First Mode

The plasma-generating apparatus according to any one of the first to twentieth modes, wherein the bubble-generating part generates the bubble such that a part of a surface of the second electrode contacts with the liquid and another portion of the surface of the second electrode contacts with the bubble or is positioned within the bubble.

Twenty Second Mode

The plasma-generating apparatus according to any one of the first to twenty first modes, wherein the gas-supplying apparatus is a pump.

Twenty Third Mode

An electric appliance which includes the plasma-generating apparatus according to any one of the first to twenty second modes as a liquid-treating apparatus, and supplies the liquid treated by the plasma-generating apparatus or conducts another treatment using the liquid treated by the plasma-generating apparatus.

Twenty Fourth Mode

The electric appliance according to the twenty third mode, which is a water purification apparatus, an air conditioner, a humidifier, a washing machine, a washing machine for electric razor or a dishwasher.

Twenty Fifth Mode

A method for generating plasma which includes:

applying voltage between a first electrode and a second electrode using a power supply, at least a part of the first electrode being positioned in liquid contained in a treatment vessel and at least a part of the second electrode being positioned in the liquid, supplying gas from a gas-supplying apparatus to a bubble-generating part positioned in the liquid to generate a bubble in the liquid, and controlling one or both of the power supply and the gas-supplying apparatus, wherein the bubble is generated such that at least surface where conductor is exposed, of a surface of the first electrode which surface is positioned in the liquid, is positioned within the bubble, plasma is generated within the bubble by the application of voltage, and one or both of the power supply and the gas-supplying apparatus are controlled such that the voltage is applied between the first electrode and the second electrode for at least a part of time during which the at least surface where the conductor is exposed, of the first electrode is positioned within the bubble.

Twenty Sixth Mode

The method for generating plasma according to the twenty fifth mode, which further includes:

detecting that the at least surface where the conductor is exposed, of the first electrode is positioned within the bubble, and controlling one or both of the power supply and the gas-supplying apparatus based on the detection results of the bubble detection.

Twenty Seventh Mode

The method for generating plasma according to the twenty fifth or twenty sixth mode, which further includes controlling one or both of the power supply and the gas-supplying apparatus such that the application of voltage is switched on and off during a period of time for which the at least surface where the conductor is exposed, of the first electrode is positioned within the bubble.

Twenty Eleventh Mode

The method for generating plasma according to any one of the twenty fifth to twenty seventh embodiments, wherein the bubble is generated in the liquid such that the time for which the at least surface where the conductor is exposed, of the first electrode is positioned within the bubble accounts for 90% or more of a certain time.

Twenty Ninth Mode

The method for generating plasma according to any one of the twenty fifth to twenty eighth modes, wherein the power supply supplies power of more than 0 W and less than 1000 W.

Thirtieth Mode

The method for generating plasma according to any one of the twenty fifth to twenty ninth modes, wherein, the first electrode is of hollow shape having an opening portion, insulator is positioned in contact with outer peripheral surface of the first electrode, the insulator is of hollow shape having an opening portion, and the first electrode is configured to be movable relatively to the insulator, which method further includes moving an end face of the opening portion of the first electrode is moved inwardly from an end face of the opening portion of the insulator.

Thirty First Embodiment

The method for generating plasma according to any one of the twenty fifth to thirtieth modes wherein the bubble is generated such that at least a part of surface of the second electrode contacts with the liquid, and another part of the surface of the second electrode contacts with or is positioned within the bubble.

Thirty Second Mode

The method for generating plasma according to any one of the twenty fifth to thirty first, which further includes measuring an emission spectrum of the plasma generated in the bubble, and analyzing a component(s) contained in the liquid contained in the treatment vessel quantitatively or qualitatively from the emission spectrum.

Thirty Third Mode

The method for generating plasma according to any one of the twenty fifth to thirty second modes, which further includes adjusting internal pressure of the bubble generated from the bubble-generating part.

Thirty Fourth Mode

The method for generating plasma according to any one of the twenty fifth to thirty third modes which further includes changing position where the bubble is generated from the bubble-generating part in a depth direction of the liquid.

Thirty Fifth Mode

The method for generating plasma according to any one of the twenty fifth to thirty fourth modes wherein, the power supply is a power supply applying an alternating voltage or a pulsed voltage, which method further comprises selecting a voltage and a frequency of the power supply and a distance between the first electrode and the second electrode such that a resistance (R) of the liquid contained in the treatment vessel is lower than a resistance (R2) formed by connection of the first electrode and the liquid when the at least surface where the conductor is exposed, of the surface of the first electrode which surface is positioned in the treatment vessel, is positioned within the bubble.

The liquid-treating apparatus of the embodiment of the present invention is useful as a water purification apparatus and so on for, for example, waste water treatment and so on, or a water analysis apparatus.

What is claimed is:

1. A plasma-generating apparatus comprising:
a first electrode of which at least a part is placed in a treatment vessel that is to contain liquid;
a second electrode of which at least a part is placed in the treatment vessel;
a bubble-generating part configured to generate a bubble in the liquid when the liquid is contained in the treatment vessel such that at least an exposed surface where conductor is exposed, of a surface of the first electrode which surface is positioned in the treatment vessel, is positioned within the bubble;
a gas-supplying apparatus configured to supply gas in an amount necessary for the bubble-generating part to generate the bubble from the outside of the treatment vessel to the bubble-generating part;
a power supply configured to apply voltage between the first electrode and the second electrode; and a control apparatus configured to:
  control the gas-supplying apparatus such that the gas is supplied to the bubble-generating part, thereby generating the bubble in the liquid, without applying the voltage between the first electrode and the second electrode, and
  control the power supply to start applying the voltage between the first electrode and the second electrode after a state where the exposed surface of the first electrode is positioned within the bubble is achieved.

2. The plasma-generating apparatus according to claim 1, further comprising a bubble detection device configured to detect that the exposed surface of the first electrode is positioned within the bubble,
  wherein the control apparatus is configured to control the power supply to start applying the voltage between the first electrode and the second electrode after the bubble detection device detects that the exposed surface of the first electrode is positioned within the bubble.

3. The plasma-generating apparatus according to claim 1, wherein the control apparatus is configured to control the gas-supplying apparatus such that the gas is supplied to the bubble-generating part and control the power supply to start applying the voltage between the first electrode and the second electrode after lapse of a predetermined time required for achievement of a state where the exposed surface where the conductor is exposed, of the first electrode is positioned within the bubble.

4. The plasma-generating apparatus according to claim 2, wherein the bubble detection device is configured to detect that the exposed surface of the first electrode is positioned within the bubble, based on one or more of the following changes which are involved by the generation of the bubble:
  change in images of vicinity of the exposed surface of the first electrode,
  change in resistance between the first electrode and another electrode which is insulated electrically from the first electrode,
  change in capacitance between the first electrode and another electrode which is insulated electrically from the first electrode,
  change in resistance between a third electrode and a fourth electrode which are insulated electrically from the first electrode,
  change in capacitance between a third electrode and a fourth electrode which are insulated electrically from the first electrode,
  change in an optical path or a light quantity of light which passes through the liquid,
  change in an acoustic wave which passes through the liquid, and
  change in pressure in the liquid.

5. The plasma-generating apparatus according to claim 1, wherein a maximum value of output capacity of the power supply is more than 0 W and less than 1000 W.

6. The plasma-generating apparatus according to claim 1, wherein:
  the first electrode is of a hollow shape having an opening portion,
  insulator is positioned in contact with an outer peripheral surface of the first electrode,
  the bubble-generating part is configured to generate the bubble from the opening portion of the first electrode,
  the bubble-generating part is configured to generate the bubble such that a surface where the insulator is not positioned and the conductor is exposed, of the surface of the first electrode which surface is positioned in the treatment vessel, is positioned within the bubble.

7. The plasma-generating apparatus according to claim 6, wherein a direction in which the opening portion of the first electrode is opened is from 0° to 60° when 0° is defined as a direction in which gravity is given and 180° is defined as a direction opposite to the direction in which the gravity is given.

8. The plasma-generating apparatus according to claim 6, wherein a direction in which the opening portion is opened is from 80° to 100° when 0° is defined as a direction in which gravity is given and 180° is defined as a direction opposite to the direction in which the gravity is given.

9. The plasma-generating apparatus according to claim 6, wherein an inner diameter of the first electrode is from 0.3 mm to 2 mm and an outer diameter of the first electrode is from 1 mm to 3 mm.

10. The plasma-generating apparatus according to claim 6, wherein an end face of the opening portion of the first electrode is positioned inwardly from an end face of the insulator.

11. The plasma-generating apparatus according to claim 10, wherein an outer diameter of the first electrode is from 1 mm to 3 mm.

12. The plasma-generating apparatus according to claim 6, wherein:
  the insulator is of a hollow shape having an opening portion, and
  the first electrode is movable relatively to the insulator.

13. The plasma-generating apparatus according to claim 12, wherein an end face of the opening portion of the first electrode is moved inwardly from an end face of the insulator after the power supply applies the voltage between the first electrode and the second electrode.

14. The plasma-generating apparatus according to claim 1, further comprising an optical detection device configured to measure an emission spectrum of the plasma,
  wherein one or more components in the liquid to be contained in the treatment vessel are qualitatively or quantitatively analyzed from the emission spectrum measured by the optical detection device.

15. The plasma-generating apparatus according to claim 1, further comprising an apparatus configured to adjust an internal pressure of the bubble generated from the bubble-generating part.

16. The plasma-generating apparatus according to claim 15, further comprising a device configured to determine a size of the bubble,
  wherein the apparatus is configured to adjust the internal pressure of the bubble based on the size of the bubble which is determined by the device.

17. The plasma-generating apparatus according to claim 1, further comprising a first device configured to change a position where the bubble is generated from the bubble-generating part in a depth direction of the liquid.

18. The plasma-generating apparatus according to claim 17, further comprising a second device configured to determine a size of the bubble,
  wherein the first device is configured to change the position where the bubble is generated, based on the size of the bubble which is determined by the second device.

19. The plasma-generating apparatus according to claim 1, wherein the power supply is configured to apply a pulsed voltage.

20. The plasma-generating apparatus according to claim 1, wherein the power supply is configured to apply an alternating voltage.

21. The plasma-generating apparatus according to claim 19, wherein a voltage and a frequency of the power supply and a distance between the first electrode and the second electrode are set such that a resistance (R) of the liquid to be contained in the treatment vessel is lower than a resistance (R2) formed by connection of the first electrode and the liquid when the exposed surface of the surface of the first electrode which surface is positioned in the treatment vessel, is positioned within the bubble.

22. The plasma-generating apparatus according to claim 1, wherein the bubble-generating part is configured to generate the bubble such that a part of a surface of the second electrode contacts with the liquid and another portion of the surface of the second electrode contacts with the bubble or is positioned within the bubble.

23. The plasma-generating apparatus according to claim 1, wherein the gas-supplying apparatus is a pump.

24. An electric appliance which comprises the plasma-generating apparatus according to claim 1 as a liquid-treating apparatus,
the electric appliance is configured to supply supplies the liquid treated by the plasma-generating apparatus or conduct another treatment using the liquid treated by the plasma-generating apparatus.

25. The electric appliance according to claim 24, which is a water purification apparatus, an air conditioner, a humidifier, a washing machine, a washing machine for electric razor or a dishwasher.

* * * * *